United States Patent
Zhang et al.

(10) Patent No.: US 11,323,698 B2
(45) Date of Patent: May 3, 2022

(54) RESTRICTIONS OF USAGE OF TOOLS ACCORDING TO REFERENCE PICTURE TYPES

(71) Applicants: Beijing Bytedance Network Technology Co., Ltd., Beijing (CN); Bytedance Inc., Los Angeles, CA (US)

(72) Inventors: Na Zhang, Beijing (CN); Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/546,717

(22) Filed: Dec. 9, 2021

(65) Prior Publication Data

US 2022/0109827 A1   Apr. 7, 2022

Related U.S. Application Data

(63) Continuation of application No. PCT/CN2020/104087, filed on Jul. 27, 2020.

(30) Foreign Application Priority Data

Jul. 24, 2020 (WO) ................ PCT/CN2020/104087

(51) Int. Cl.
  *H04N 19/105* (2014.01)
  *H04N 19/132* (2014.01)
  (Continued)

(52) U.S. Cl.
  CPC ......... *H04N 19/105* (2014.11); *H04N 19/132* (2014.11); *H04N 19/137* (2014.11); *H04N 19/176* (2014.11); *H04N 19/30* (2014.11)

(58) Field of Classification Search
  CPC .. H04N 19/105; H04N 19/132; H04N 19/137; H04N 19/176; H04N 19/30
  See application file for complete search history.

(56) References Cited

U.S. PATENT DOCUMENTS

| | | |
|---|---|---|
| 9,525,861 B2 | 12/2016 | Zhang et al. |
| 9,621,920 B2 | 4/2017 | An et al. |

(Continued)

FOREIGN PATENT DOCUMENTS

| | | |
|---|---|---|
| CN | 104322070 A | 1/2015 |
| CN | 107409225 A | 11/2017 |

(Continued)

OTHER PUBLICATIONS

Akula et al. "Description of SDR, HDR and 360° Video Coding Technology Proposal Considering Mobile Application Scenario by Samsung, Huawei, GoPro, and HiSilicon," Joint Video Exploration Team (JVET)of ITU-T SG 16 WP 3 and ISO/IEC JTC 1/SC 29/WG 1110th Meeting: San Diego, US, Apr. 10-20, 2018, document JVET-J0024, 2018.

(Continued)

*Primary Examiner* — Jae N Noh
(74) *Attorney, Agent, or Firm* — Perkins Coie LLP

(57) ABSTRACT

A video processing method includes determining, for a conversion between a current video block of a video including multiple video blocks and a coded representation of the video, and from types of reference pictures used for the conversion, applicability of a coding tool to the current video block and performing the conversion based on the determining. The method may be performed by a video decoder or a video encoder or a video transcoder.

20 Claims, 18 Drawing Sheets

(51) Int. Cl.
  *H04N 19/176* (2014.01)
  *H04N 19/30* (2014.01)
  *H04N 19/137* (2014.01)

(56) References Cited

U.S. PATENT DOCUMENTS

| | | | |
|---|---|---|---|
| 10,158,884 | B2 | 12/2018 | Zhang et al. |
| 10,230,937 | B2 | 3/2019 | Lin et al. |
| 10,469,847 | B2 | 11/2019 | Xiu et al. |
| 10,542,280 | B2 | 1/2020 | Sun et al. |
| 10,841,609 | B1 | 11/2020 | Liu et al. |
| 2012/0189058 | A1* | 7/2012 | Chen .................. H04N 19/46 375/E7.243 |
| 2015/0160390 | A1 | 6/2015 | Goyal et al. |
| 2015/0358599 | A1 | 12/2015 | Lin et al. |
| 2016/0073132 | A1 | 3/2016 | Zhang et al. |
| 2018/0014017 | A1 | 1/2018 | Li et al. |
| 2019/0222848 | A1 | 7/2019 | Chen et al. |
| 2020/0366928 | A1 | 11/2020 | Liu et al. |
| 2020/0382795 | A1 | 12/2020 | Zhang et al. |
| 2020/0396453 | A1 | 12/2020 | Zhang et al. |
| 2021/0029362 | A1 | 1/2021 | Liu et al. |
| 2021/0076063 | A1 | 3/2021 | Liu et al. |
| 2021/0092404 | A1* | 3/2021 | Huang .................. H04N 19/513 |
| 2021/0092435 | A1 | 3/2021 | Liu et al. |
| 2021/0160511 | A1 | 5/2021 | Zhang et al. |
| 2021/0160533 | A1 | 5/2021 | Zhang et al. |
| 2021/0218985 | A1 | 7/2021 | Liu et al. |
| 2021/0227209 | A1 | 7/2021 | Liu et al. |
| 2021/0258598 | A1 | 8/2021 | Hendry et al. |
| 2021/0274208 | A1 | 9/2021 | Zhang et al. |
| 2021/0289216 | A1 | 9/2021 | Liu et al. |
| 2021/0377561 | A1 | 12/2021 | Zhang et al. |
| 2021/0392327 | A1 | 12/2021 | Zhang et al. |
| 2022/0007047 | A1 | 1/2022 | Zhang et al. |
| 2022/0007048 | A1 | 1/2022 | He et al. |

FOREIGN PATENT DOCUMENTS

| | | | |
|---|---|---|---|
| WO | 2018175720 | A1 | 9/2018 |
| WO | WO-2019192102 | A1 * | 10/2019 ........... H04N 19/105 |

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018.

Esenlik et al. "CE9: DMVR with Bilateral Matching (Test2.9)," Joint Video Experts Team (JVET)of ITU-T SG 16 WP 3 and ISO/IEC JTC 1/SC 29/WG 1111th Meeting: Ljubljana, SI, Jul. 10-18, 2018, document JVET-K0217, 2018.

Esenlik et al. "CE9: Report on the Results of Tests CE9.2.15 and CE9.2.16," Joint Video Experts Team (JVET)of ITU-T SG 16 WP 3 and ISO/IEC JTC 1/SC 29/WG 1112th Meeting: Macao, CN, Oct. 3-12, 2018, document JVET-L0163, 2018.

"Information Technology—High Efficiency Coding and Media Delivery in Heterogeneous Environments—Part 2: High Efficiency Video Coding" Apr. 20, 2018, ISO/DIS 23008, 4th Edition.

Luo et al. "CE4: Prediction Refinement with Optical Flow for Affine Mode (Test 2.1)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0070, 2019.

Park et al. "Non-CE4 : Symmetric-MVD Control Considering the Reference Picture type," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0414, 2019.

Park et al. "Non-CE4 : Fix of POC Distance Condition for MMVD," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0415, 2019.

Sethuraman et al. "Decoder Side MV Refinement/Derivation with CTB-Level Concurrency and Other Normative Complexity Reduction Techniques," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0041, 2018.

http://phenix.it-sudparis.eu/jvet/doc_end_user/current_document.php?id=5755.

https://vcgit.hhi.fraunhofer.de/jvet/VVCSoftware_VTM/tags/VTM-5.0.

JEM-7.0: https://jvet.hhi.fraunhofer.de/svn/svn_HMJEMSoftware/tags/ HM-16.6-JEM-7.0.

International Search Report and Written Opinion from International Patent Application No. PCT/CN2020/104087 dated Nov. 3, 2020 (12 pages).

* cited by examiner

RESTRICTIONS OF USAGE OF TOOLS ACCORDING TO REFERENCE PICTURE TYPES

CROSS REFERENCE TO RELATED APPLICATIONS

This application is a continuation of International Patent Application No. PCT/CN2020/104087, filed on Jul. 24, 2020, which claims the priority to and benefits of International Patent Application No. PCT/CN2019/098068, filed on Jul. 27, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which reference pictures are used in video coding or decoding.

In one example aspect a method of video processing is disclosed. The method includes determining, for a conversion between a current video block of a current picture of a video and a coded representation of the video, an applicability of a coding tool to the current video block based on types of reference pictures used for the conversion; and performing the conversion based on the determining, wherein the types of the reference pictures are at least based on 1) whether the reference pictures are short term reference pictures or long term reference pictures, 2) resolutions of the reference pictures or the current picture, or 3) picture order count (POC) distances of the reference pictures relative to the current picture.

In another example aspect, another method of video processing is disclosed. The method includes determining, for a conversion between a current video block of a video and a coded representation of the video, an applicability of a bi-directional optical flow (BDOF) coding tool or a decoder side motion vector refinement (DMVR) coding tool to the current video block based on types of reference pictures used for the conversion; and performing the conversion based on the determining, wherein, using the BDOF coding tool, one or more initial predictions are refined based on an optical flow calculation, and wherein, using the DMVR coding tool, motion information of the current video block is refined using prediction blocks of the current video block, and wherein the types of reference pictures are at least based on 1) whether the reference pictures are short term reference pictures or long term reference pictures, 2) resolutions of the reference pictures or the current picture, or 3) picture order count (POC) distances of the reference pictures relative to the current picture.

In another example aspect, another method of video processing is disclosed. The method includes performing a conversion between a current video block of a current picture of a video and a coded representation of the current video block using a merge mode motion vector difference (MMVD) coding in which a merge candidate is selected to be used as a base merge candidate and refined with motion vector difference (MVD) information, without scaling the MVD information; and wherein the base merge candidate is a bi-directional motion vector, and wherein a MVD of one prediction direction is set as equal to a MVD included in the coded representation and another MVD of the other prediction direction is set as equal or opposite to the MVD included in the coded representation based on a coding condition of the video.

In another example aspect, another method of video processing is disclosed. The method includes performing a conversion between a current video block of a current picture of a video and a coded representation of the current video block using a merge mode motion vector difference (MMVD) coding in which a merge candidate is selected to be used as a base merge candidate and refined with motion vector difference (MVD) information, wherein the coded representation conforms to a rule that specifies that at most a first MVD value for a first prediction direction is included in the coded representation.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

Figure 1:
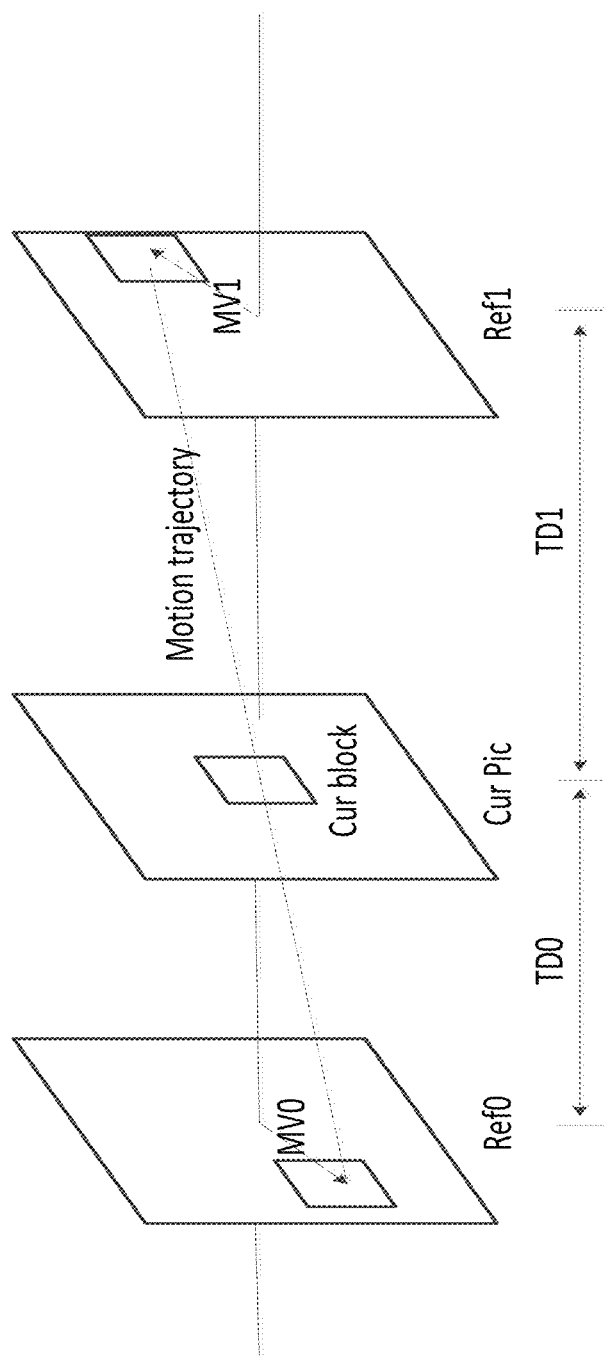
FIG. 1 shows an example of bilateral matching.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to palette coding with employing base colors based representation in video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 4) could be found at:
http://phenix.it-sudparis.eu/jvet/doc_end_user/current_document.php?id=5755

The latest reference software of VVC, named VTM, could be found at:
https://vcgit.hhi.fraunhofer.de/jvet/VVCSoftware_VTM/tags/VTM-5.0

2.1 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad (1)$$

As shown in the FIG. 1, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 2:
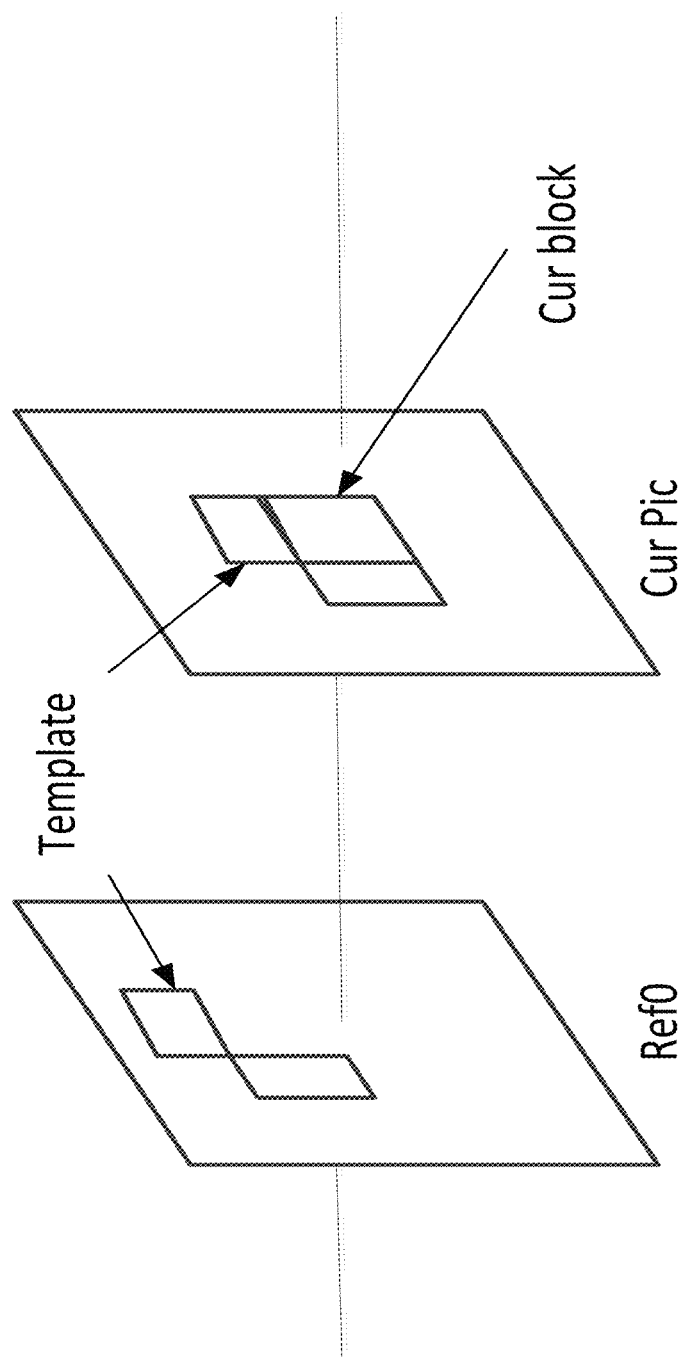
FIG. 2 shows an example of template matching.

As shown in FIG. 2, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

CU Level MV Candidate Set

The MV candidate set at CU level consists of:
(i) Original AMVP candidates if the current CU is in AMVP mode
(ii) all merge candidates,
(iii) several MVs in the interpolated MV field.
(iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

Sub-CU Level MV Candidate Set

The MV candidate set at sub-CU level consists of:
(i) an MV determined from a CU-level search,
(ii) top, left, top-left and top-right neighbouring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

Generation of Interpolated MV Field

Before coding a frame, interpolated motion field is generated for the whole picture based on unilateral ME. Then the motion field may be used later as CU level or sub-CU level MV candidates.

Figure 3:
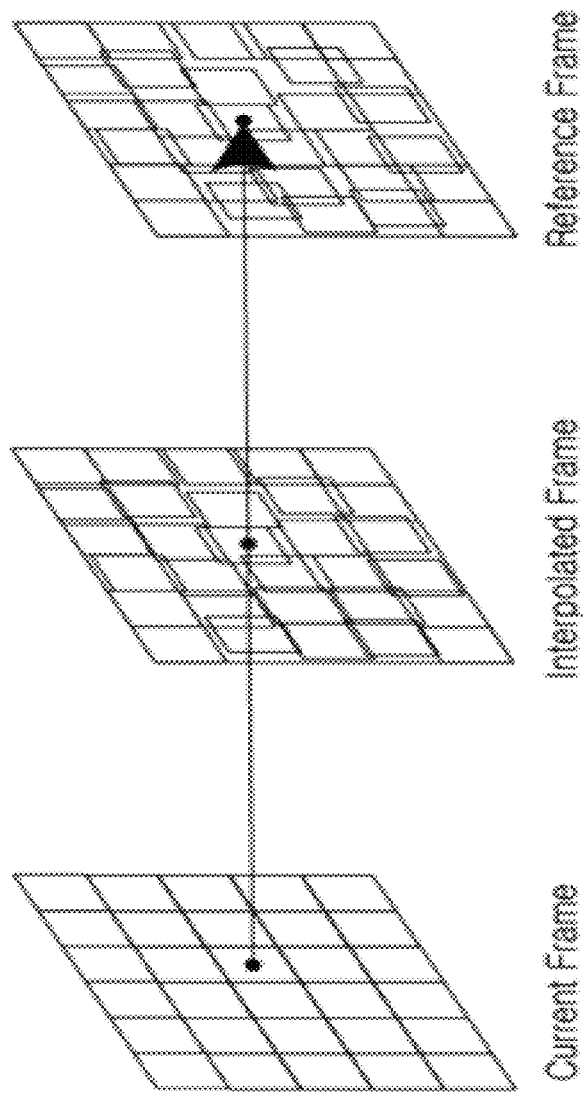
FIG. 3 shows an example of unilateral motion estimation (ME) in frame rate upconversion (FRUC).

First, the motion field of each reference pictures in both reference lists is traversed at 4×4 block level. For each 4×4 block, if the motion associated to the block passing through a 4×4 block in the current picture (as shown in FIG. 3) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

FIG. 3 shows an example of unilateral ME in FRUC

Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad (2)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)
   bi-prediction is used;
Otherwise, if cost0<=cost1
   uni-prediction from list0 is used;
Otherwise,
   uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

2.2 Hybrid Intra and Inter Prediction

In JVET-L0100, multi-hypothesis prediction is proposed, wherein hybrid intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

2.3 Bi-Directional Optical Flow

Motion compensation is first performed to generate the first predictions (in each prediction direction) of the current block. The first predictions are used to derive the spatial gradient, the temporal gradient and the optical flow of each subblock/pixel within the block, which are then used to generate the second prediction, i.e., the final prediction of the subblock/pixel. The details are described as follows.

Bi-directional Optical flow (BIO, also known as BDOF) is sample-wise motion refinement which is performed on top of block-wise motion compensation for bi-prediction. The sample-level motion refinement doesn't use signalling.

Figure 4:
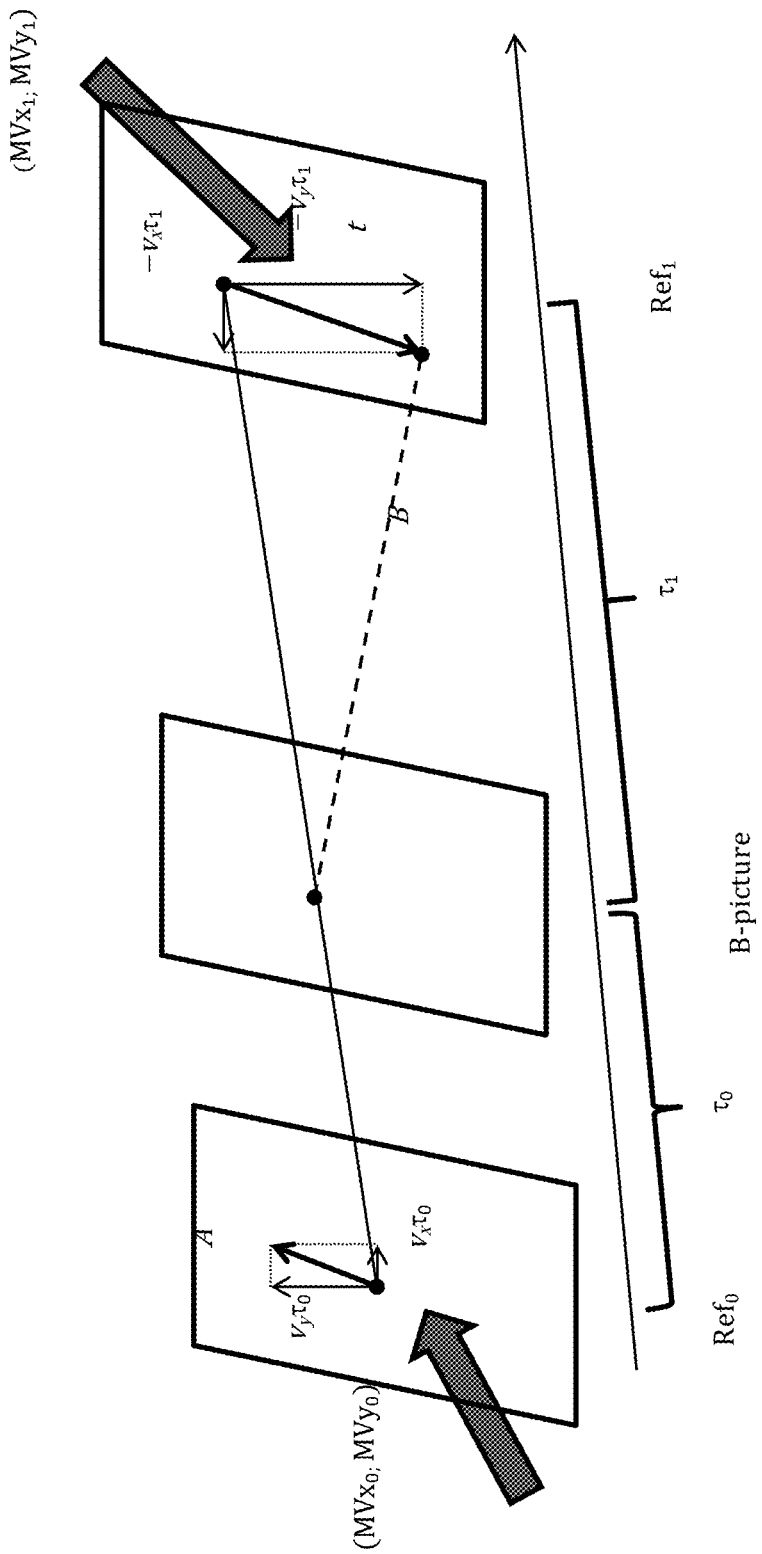
FIG. 4 shows an example of optical flow trajectory.

FIG. 4 shows an example of optical flow trajectory.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field ($v_x$, $v_y$) is given by an equation $$\partial I^{(k)}/\partial t + v_x \partial I^{(k)}/\partial x + v_y \partial I^{(k)}/\partial y = 0. \quad (3)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (4)$$

Here, $\tau_0$ and $\tau_1$ denote the distances to the reference frames as shown on a FIG. 4. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion (MVx$_0$, MVy$_0$, MVx$_1$, MVy$_1 \neq 0$) and the block motion vectors are proportional to the time distance (MVx$_0$/MVx$_1$=MVy$_0$/MVy$_1$=−$\tau_0$/$\tau_1$).

The motion vector field ($v_x$, $v_y$) is determined by minimizing the difference Δ between values in points A and B (intersection of motion trajectory and reference frame planes on FIG. 4). Model uses only first linear term of a local Taylor expansion for Δ:

$$\Delta = (I^{(0)} - I^{(1)} + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (5)$$

All values in Equation 5 depend on the sample location (i', j'), which was omitted from the notation so far. Assuming the motion is consistent in the local surrounding area, we minimize Δ inside the (2M+1)×(2M+1) square window Ω centered on the currently predicted point (i,j), where M is equal to 2:

$$(v_x, v_y) = \underset{v_x, v_y}{\text{argmin}} \sum_{[i',j']\in\Omega} \Delta^2[i', j'] \quad (6)$$

For this optimization problem, the JEM uses a simplified approach making first a minimization in the vertical direction and then in the horizontal direction. This results in $$v_x = (s_1 + r) > m\,?\,\text{clip3}\left(-thBIO, thBIO, -\frac{s_3}{(s_1+r)}\right) : 0 \quad (7)$$

$$v_y = (s_5 + r) > m\,?\,\text{clip3}\left(-thBIO, thBIO, -\frac{s_6 - v_x s_2/2}{(s_5+r)}\right) : 0 \quad (8)$$

where, $$s_1 = \sum_{[i',j']\in\Omega} (\tau_1 \partial I^{(1)}/\partial x + \tau_0 \partial I^{(0)}/\partial x)^2; \quad (9)$$

$$s_3 = \sum_{[i',j']\in\Omega} (I^{(1)} - I^{(0)})(\tau_1 \partial I^{(1)}/\partial x + \tau_0 \partial I^{(0)}/\partial x);$$

$$s_2 = \sum_{[i',j']\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j']\in\Omega} (\tau_1 \partial I^{(1)}/\partial y + \tau_0 \partial I^{(0)}/\partial y)^2;$$

$$s_6 = \sum_{[i',j']\in\Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m are introduced in Equations 7 and 8.

$$r = 500 \cdot 4^{d-8} \quad (10)$$

$$m = 700 \cdot 4^{d-8} \quad (11)$$

Here d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 9, (2M+1)×(2M+1) square window Ω centered in currently predicted point on a boundary of predicted block needs to accesses positions outside of the block (as shown in FIG. 5A). In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 5B.

Figure 5B:
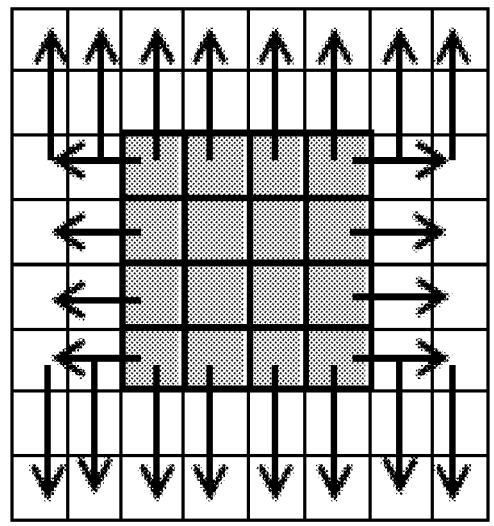
FIG. 5A-5B show examples of bidirectional optical flow without block extension.
Figure 5A:
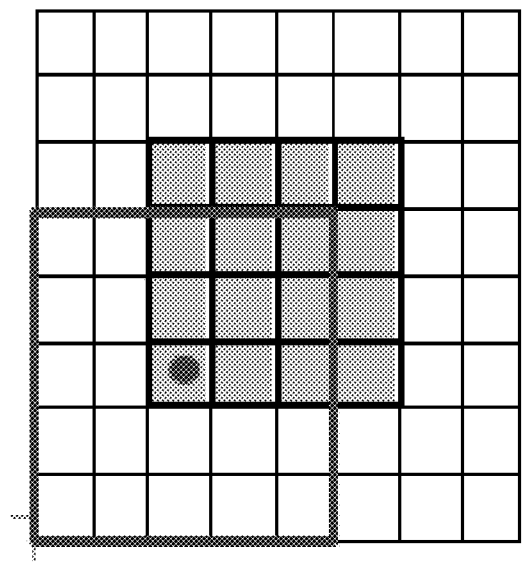

FIGS. 5A, 5B show examples of BIO w/o block extension. FIG. 5A shows access positions outside of the block; FIG. 5B shows padding issued in order to avoid extra memory access and calculation.

With BIO, it's possible that the motion field can be refined for each sample. To reduce the computational complexity, a block-based design of BIO is used in the JEM. The motion refinement is calculated based on 4×4 block. In the block-based BIO, the values of 0.5, in Equation 9 of all samples in a 4×4 block are aggregated, and then the aggregated values of 0.5, in are used to derived BIO motion vectors offset for the 4×4 block. More specifically, the following formula is used for block-based BIO derivation:

$$s_{1,b_k} = \sum_{(x,y)\in b_k} \sum_{[i',j]\in \Omega(x,y)} (\tau_1 \partial I^{(1)}/\partial x + \tau_0 \partial I^{(0)}/\partial x)^2; \quad (12)$$

$$s_{3,b_k} = \sum_{(x,y)\in b_k} \sum_{[i',j]\in \Omega} (I^{(1)} - I^{(0)})(\tau_1 \partial I^{(1)}/\partial x + \tau_0 \partial I^{(0)}/\partial x);$$

$$s_{2,b_k} = \sum_{(x,y)\in b_k} \sum_{[i',j]\in \Omega} (\tau_1 \partial I^{(1)}/\partial x + \tau_0 \partial I^{(0)}/\partial x)$$

$$(\tau_1 \partial I^{(1)}/\partial y + \tau_0 \partial I^{(0)}/\partial y);$$

$$s_{5,b_k} = \sum_{(x,y)\in b_k} \sum_{[i',j]\in \Omega} (\tau_1 \partial I^{(1)}/\partial y + \tau_0 \partial I^{(0)}/\partial y)^2;$$

$$s_6 = \sum_{(x,y)\in b_k} \sum_{[i',j]\in \Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Equations 7 and 8 are replaced by $((s_{n,bk})>>4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12\times 2^{14-d}$; otherwise, it is set to $12\times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fraX, fracY) according to the fractional part of block motion vector. In case of horizontal gradient $\partial I/\partial x$ signal first interpolated vertically using BIOfilterS corresponding to the fractional position fracY with de-scaling shift d-8, then gradient filter BIOfilterG is applied in horizontal direction corresponding to the fractional position fracX with de-scaling shift by 18-d. In case of vertical gradient $\partial I/\partial y$ first gradient filter is applied vertically using BIOfilterG corresponding to the fractional position fracY with de-scaling shift d-8, then signal displacement is performed using BIOfilterS in horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity.

Table 1 shows the filters used for gradients calculation for different fractional positions of block motion vector in BIO. Table 2 shows the interpolation filters used for prediction signal generation in BIO.

TABLE 1

Filters for gradients calculation in BIO

| Fractional pel position | Interpolation filter for gradient(BIOfilterG) |
| --- | --- |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Interpolation filters for prediction signal generation in BIO

| Fractional pel position | Interpolation filter for prediction signal(BIOfilterS) |
| --- | --- |
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

A two-stage early termination method is used to conditionally disable the BIO operations depending on the similarity between the two prediction signals. The early termination is first applied at the CU-level and then at the sub-CU-level. Specifically, the proposed method first calculates the SAD between the L0 and L1 prediction signals at the CU level. Given that the BIO is only applied to luma, only the luma samples need to be considered for the SAD calculation. If the CU-level SAD is no larger than a predefined threshold, the BIO process is completely disabled for the whole CU. The CU-level threshold is set to $2^{(BDepth-9)}$ per sample. If the BIO process is not disabled at the CU level, and if the current CU contains multiple sub-CUs, the SAD of each sub-CU inside the CU will be calculated. Then, the decision on whether to enable or disable the BIO process is made at the sub-CU-level based on a predefined sub-CU-level SAD threshold, which is set to $3*2^{(BDepth-10)}$ per sample.

BIO is also known as BDOF.
BDOF Application Condition
In VTM5, the BDOF can be applied for the CUs which are coded with following modes and features:
  sps_bdof_enabled_flag is equal to 1.
  predFlagL0[0][0] and predFlagL1[0][0] are both equal to 1.

DiffPicOrderCnt(currPic, RefPicList[0][refIdxL0])*DiffPicOrderCnt(currPic, RefPicList[1][refIdxL1]) is less than 0.

MotionModelIdc[xCb][yCb] is equal to 0.
merge_subblock_flag[xCb][yCb] is equal to 0.
sym_mvd_flag[xCb][yCb] is equal to 0.
BcwIdx[xCb][yCb] is equal to 0.
luma_weight_l0_flag[refIdxL0] and luma_weight_l1_flag[refIdxL1] are both equal to 0.
cbHeight is greater than or equal to 8
colour component index of the current block is equal to 0.

Maximum BDOF Processing Unit

When the width and/or height of a CU are larger than 16 luma samples, it will be split into sub-blocks with width and/or height equal to 16 luma samples, and the sub-block boundaries are treated as the CU boundaries in the BDOF process. The maximum unit size for BDOF process is limit to 16×16.

2.4 Decoder-Side Motion Vector Refinement

In bi-prediction operation, for the prediction of one block region, two prediction blocks, formed using a motion vector (MV) of list0 and a MV of list1, respectively, are combined to form a single prediction signal. In JVET-K0217, the decoder-side motion vector refinement (DMVR) method, the two motion vectors of the bi-prediction are further refined by a bilateral matching process.

In the proposed method DMVR is applied only in Merge and Skip modes, if the following condition is true:

(POC−POC0)*(POC−POC1)<0, where POC—picture order count of current to be encoded picture, POC0 and POC1—picture order counts of the references for the current picture.

The signaled merge candidate pair is used as input to DMVR process and are denoted initial motion vectors (MV0, MV1). The search points that are searched by DMVR obey the motion vector difference mirroring condition. In other words any point that is checked by DMVR, denoted by candidate motion vector pair (MV0', MV1') obey the following two equations:

$$MV0'=MV0+MV_{diff}$$

$$MV1'=MV1-MV_{diff}$$

Where $MV_{diff}$ represents the points in the search space in one of the reference pictures.

After the construction of the search space the uni-lateral predictions are constructed using regular 8-tap DCTIF interpolation filter. Bilateral matching cost function is calculated by using MRSAD (mean removed sum of absolute differences) between the two predictions (FIG. 6) and the search point resulting in the minimum cost is selected as the refined MV pair. For the MRSAD calculation 16 bit precision of samples is used (which is the output of the interpolation filtering), and no clipping and no rounding operations are applied before MRSAD calculation. The reason for not applying rounding and clipping is to reduce internal buffer requirement.

Figure 6:
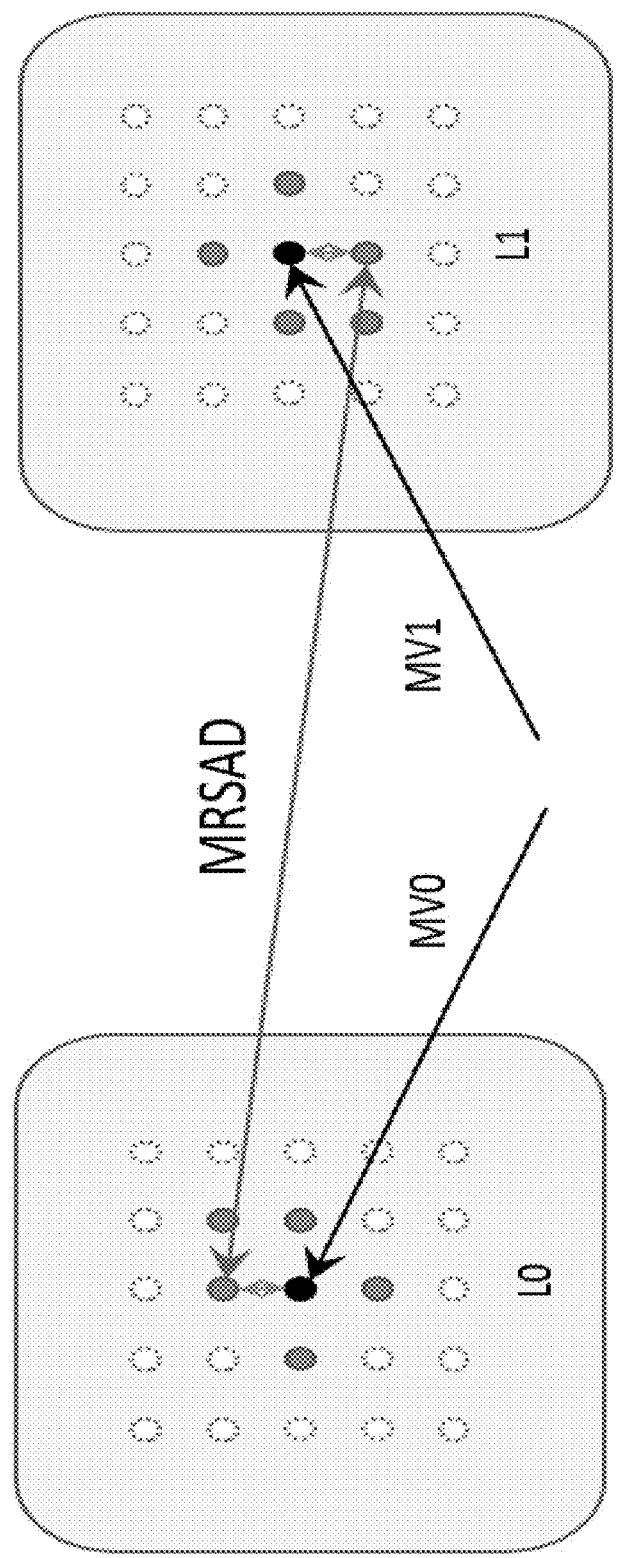
FIG. 6 shows an example of bilateral matching with 6-point search.

FIG. 6 shows an example of bilateral matching with 6 points search

Figure 7:
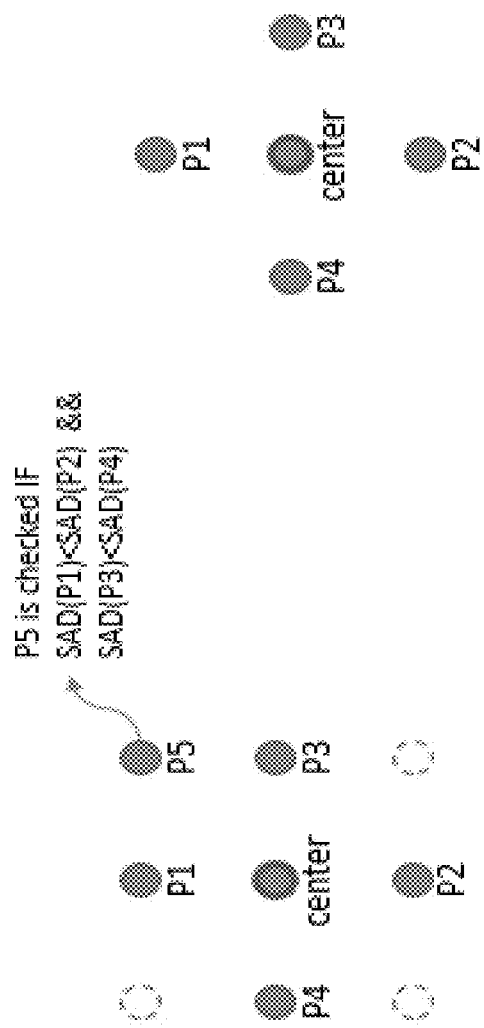
FIG. 7 shows examples of an adaptive integer search pattern (left), and a half sample search pattern (right).

In the proposed method the integer precision search points are chosen by the Adaptive pattern method. The cost, corresponding to the central points (pointed by the initial motion vectors) is calculated firstly. The other 4 costs (in sign shape) is calculated by the two predictions, located at the opposite sides of each other by the central point. Last 6th point at the angle is chosen by the gradient of the previous calculated costs (FIG. 7, showing adaptive integer search pattern (left), half sample search pattern (right)).

The output of the DMVR process is the refined motion vector pair corresponding to the minimal cost.

If after one iteration the minimum cost is achieved at the central point of the search space, i.e. the motion vectors are not changed, and the refinement process is terminated. Otherwise, the best cost further is regarded as center, and the process continues, while the minimal cost does not correspond to the central point and the search range is not exceeded.

Half sample precision search is applied only if application of half-pel search does not exceed the search range. In this case only 4 MRSAD calculations are performed, corresponding to plus shape points around the central one, which is chosen as the best during the integer precision search. At the end the refined motion vector pair is output that correspond to the minimal cost point.

Some simplifications and improvements are further proposed in JVET-L0163.

Reference Sample Padding

Reference sample padding is applied in order to extend the reference sample block that is pointed by the initial motion vector. If the size of the coding block are given by "w" and "h", then it is assumed that a block of size w+7 and h+7 is retrieved from the reference picture buffer. The retrieved buffer is then extended by 2 samples in each direction by repetitive sample padding using the nearest sample. Afterwards the extended reference sample block is used to generate the final prediction once the refined motion vector is obtained (which can deviate from the initial motion vector 2 samples in each direction).

It is noted that this modification eliminates the external memory access requirement of DMVR completely without any coding loss.

Bilinear Interpolation Instead of 8-Tap DCTIF

According to the proposal bilinear interpolation is applied during the DMVR search process, which means that the predictions used in MRSAD computation are generated using bilinear interpolation. Once the final refined motion vectors are obtained regular 8-tap DCTIF interpolation filter is applied to generate final predictions.

Early Termination Based on MV Difference Between Merge Candidates

An additional condition is imposed on DMVR to confine the MV refinement process. With it, DMVR is conditionally disabled when the below condition is satisfied.

The MV difference between the selected merge candidate and any of the previous ones in the same merge list is less than a pre-defined threshold (that is, ¼-, ½- and 1-pixel-wide intervals for CUs with less than 64 pixels, less than 256 pixels and at least 256 pixels, respectively).

Early Termination Based on SAD Cost at the Center Search Coordinate

The sum of absolute difference (SAD) between the two prediction signals (L0 and L1 prediction) using the initial motion vectors of the current CU is calculated. If the SAD is no larger than a predefined threshold, i.e., $2^{(BDepth-9)}$ per sample, the DMVR is skipped; otherwise, the DMVR is still applied to refine the two motion vectors of the current block.

MRSAD Computation Using Every Second Row

The MRSAD cost is computed only for odd numbered rows of a block, the even numbered samples rows are not considered. Accordingly the number of operations for the MRSAD calculation is halved.

Parametric Error Surface Based Sub-Pixel Offsets Estimation

In JVET-K0041, a parametric error surface fitted using integer distance position evaluated costs to determine $\frac{1}{16}^{th}$-pel accurate sub-pixel offsets with very minimal computational complexity was proposed.

This method is adopted into VVC and is summarized below:
1. The parametric error surface fit is computed only if the minimum matching cost of integer MVD is not equal to 0, and the matching cost of zero MVD is larger than a threshold.
2. The best integer position is taken as the center position, cost of the center position and cost of positions (−1,0), (0,−1), (1,0) and (0,1) (in unit of integer pixel) relative to the center position are used to fit a 2-D parabolic error surface equation of the form:

$$E(x,y)=A(x-x_0)^2+B(y-y_0)^2+C$$

where $(x_0, y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E(0,1))/(2(E(0,-1)+E(0,1)-2E(0,0)))$$

$(x_0, y_0)$ can be computed to any required sub-pixel precision by adjusting the precision at which the division is performed (i.e. how many bits of quotient are computed). For $\frac{1}{16}^{th}$-pel accuracy, just 4-bits in the absolute value of the quotient needs to be computed, which lends itself to a fast shifted subtraction based implementation of the 2 divisions required per CU.

3. The computed $(x_0, y_0)$ are added to the integer distance refinement MV to get the sub-pixel accurate refinement delta MV.

Figure 8:
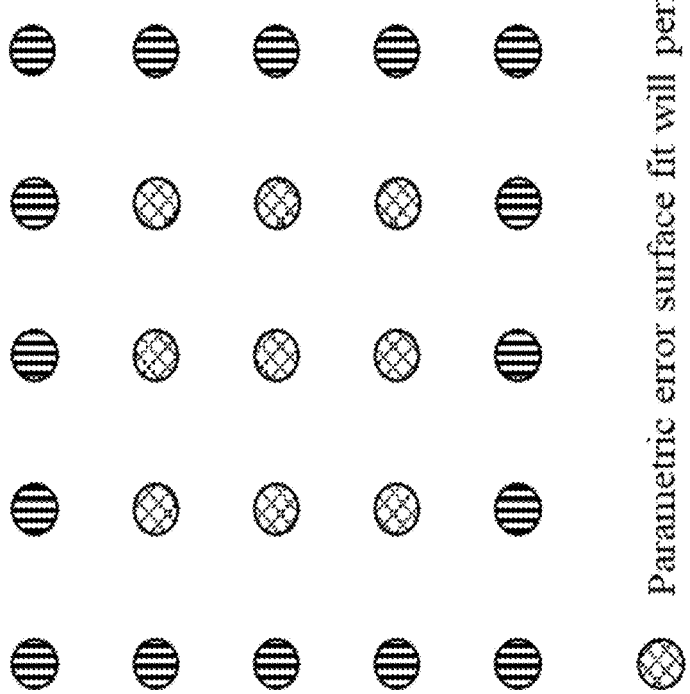
FIG. 8 shows examples of integer positions where parametric error surface fit will be performed.

Meanwhile, for the 5*5 search space, parametric error surface fit is performed only when one of the center 9 positions is the best integer position, as shown in FIG. 8.

DMVR Application Condition

In VTM5, the DMVR can be applied for the CUs which are coded with following modes and features:
sps_dmvr_enabled_flag is equal to 1
CU level merge mode with bi-prediction MV
One reference picture is in the past and another reference picture is in the future with respect to the current picture
The distances (i.e. POC difference) from both reference pictures to the current picture are same
CU has more than 64 luma samples
Both CU height and CU width are larger than or equal to 8 luma samples
BCW weight index indicates equal weight
WP is not enabled for the current block
MMVD mode is not used for the current block Maximum DMVR Processing Unit When the width and/or height of a CU are larger than 16 luma samples, it will be further split into sub-blocks with width and/or height equal to 16 luma samples. The maximum unit size for DMVR searching process is limit to 16×16.

2.5 Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is singnaled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis (or base merge candidate). The merge candidate flag is signalled to specify which one is used.

Figure 9:
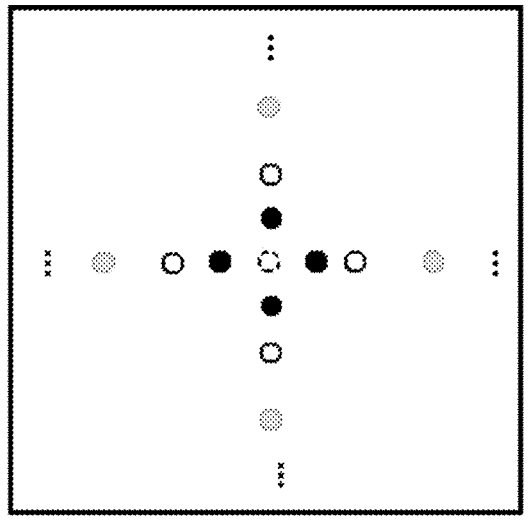
FIG. 9 shows an example of a merge with motion vector difference (MMVD) search point.
Figure 9:
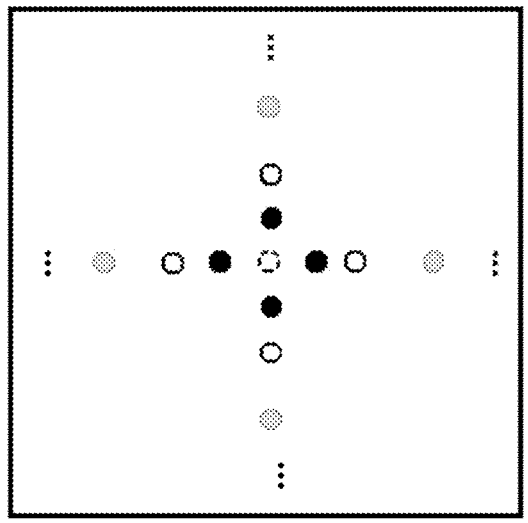

Distance index specifies motion magnitude information and indicate the pre-defined offset from the starting point. As shown in FIG. 9, an offset is added to either horizontal component or vertical component of starting MV. The relation of distance index and pre-defined offset is specified in Table 3.

TABLE 3

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent of the four directions as shown in Table 4. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 4 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 4 specifies the sign of MV offset added to the list0 MV component of starting MV and the sign for the list1 MV has opposite value.

TABLE 4

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.6 Spec for MMVD in WC

Spec of MMVD (in JVET-N1001-v10) is as follows:
8.5.2.7 Derivation Process for Merge Motion Vector Difference
Inputs to this process are:
a luma location (xCb, yCb) of the top-left sample of the current luma coding block relative to the top-left luma sample of the current picture,
reference indices refIdxL0 and refIdxL1,
prediction list utilization flags predFlagL0 and predFlagL1.

Outputs of this process are the luma merge motion vector differences in 1/16 fractional-sample accuracy mMvdL0 and mMvdL1.

The variable currPic specifies the current picture.

The luma merge motion vector differences mMydL0 and mMydL1 are derived as follows:

If both predFlagL0 and predFlagL1 are equal to 1, the following applies:

currPocDiffL0=DiffPicOrderCnt(currPic,RefPicList [0][refIdxL0])  (8-349)

currPocDiffL1=DiffPicOrderCnt(currPic,RefPicList [1][refIdxL1])  (8-350)

If currPocDiffL0 is equal to currPocDiffL1, the following applies:

mMvdL0[0]=MmvdOffset[xCb][yCb][0]  (8-351)

mMvdL0[1]=MmvdOffset[xCb][yCb][1]  (8-352)

mMvdL1[0]=MmvdOffset[xCb][yCb][0]  (8-353)

mMvdL1[1]=MmvdOffset[xCb][yCb][1]  (8-354)

Otherwise, if Abs(currPocDiffL0) is greater than or equal to Abs(currPocDiffL1), the following applies:

mMvdL0[0]=MmvdOffset[xCb][yCb][0]  (8-355)

mMvdL0[1]=MmvdOffset[xCb][yCb][1]  (8-356)

If RefPicList[0][refIdxL0] is not a long-term reference picture and RefPicList[1][refIdxL1] is not a long-term reference picture, the following applies:

td=Clip3(−128,127,currPocDiffL0)  (8-357)

tb=Clip3(−128,127,currPocDiffL1)  (8-358)

tx=(16384+(Abs(td)>>1))/td  (8-359)

distScaleFactor=Clip3(¦4096,4095,(tb*tx+32)>>6)  (8-360)

mMvdL1[0]=Clip3(−$2^{15}$,$2^{15}$−1,
(distScaleFactor*mMvdL0[0]+128−
(distScaleFactor*mMvdL0[0]>=0))>>8)  (8-361)

mMvdL1[1]=Clip3(−$2^{15}$,$2^{15}$−1,
(distScaleFactor*mMvdL0[1]+128−
(distScaleFactor*mMvdL0[1]>=0))>>8)  (8-362)

Otherwise, the following applies:

mMvdL1[0]=Sign(currPocDiffL0)==Sign(curr-PocDiffL1)?mMvdL0[0]: −mMvdL0[0]  (8-363)

mMvdL1[1]=Sign(currPocDiffL0)==Sign(curr-PocDiffL1)?mMvdL0[1]: −mMvdL0[1]  (8-364)

Otherwise (Abs(currPocDiffL0) is less than Abs(curr-PocDiffL1)), the following applies:

mMvdL1[0]=MmvdOffset[xCb][yCb][0]  (8-365)

mMvdL1[1]=MmvdOffset[xCb][yCb][1]  (8-366)

If RefPicList[0][refIdxL0] is not a long-term reference picture and RefPicList[1][refIdxL1] is not a long-term reference picture, the following applies:

td=Clip3(−128,127,currPocDiffL1)  (8-367)

tb=Clip3(−128,127,currPocDiffL0)  (8-368)

tx=(16384+(Abs(td)>>1))/td  (8-369)

distScaleFactor=Clip3(−4096,4095,(tb*tx+32)>>6)  (8-370)

mMvdL0[0]=Clip3(−$2^{15}$,$2^{15}$−1,
(distScaleFactor*mMvdL1[0]+128−
(distScaleFactor*mMvdL1[0]>=0))>>8)  (8-371)

mMvdL0[1]=Clip3(−$2^{15}$,$2^{15}$−1,
(distScaleFactor*mMvdL1[1]+128−
(distScaleFactor*mMvdL1[1]>=0))>>8))  (8-372)

Otherwise, the following applies:

mMvdL0[0]=Sign(currPocDiffL0)==Sign(curr-PocDiffL1)?mMvdL1[0]: −mMvdL1[0]  (8-373)

mMvdL0[1]=Sign(currPocDiffL0)==Sign(curr-PocDiffL1)?mMvdL1[1]: −mMvdL1[1]  (8-374)

Otherwise (predFlagL0 or predFlag1 are equal to 1), the following applies for X being 0 and 1:

mMvdLX[0]=(predFlagLX==1)?MmvdOffset[xCb] [yCb][0]:0  (8-375)

mMvdLX[1]=(predFlagLX==1)?MmvdOffset[xCb] [yCb][1]:0  (8-376)

2.7 JVET-O0070: Prediction Refinement with Optical Flow (PROF) for Affine Mode To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF is described as following four steps.

Step 1) The sub-block-based affine motion compensation is performed to generate sub-block prediction I(i,j).

Step 2) The spatial gradients $g_x(i,j)$ and $g_y(i,j)$ of the sub-block prediction are calculated at each sample location using a 3-tap filter [−1, 0, 1].

$$g_x(i,j)=I(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 10:
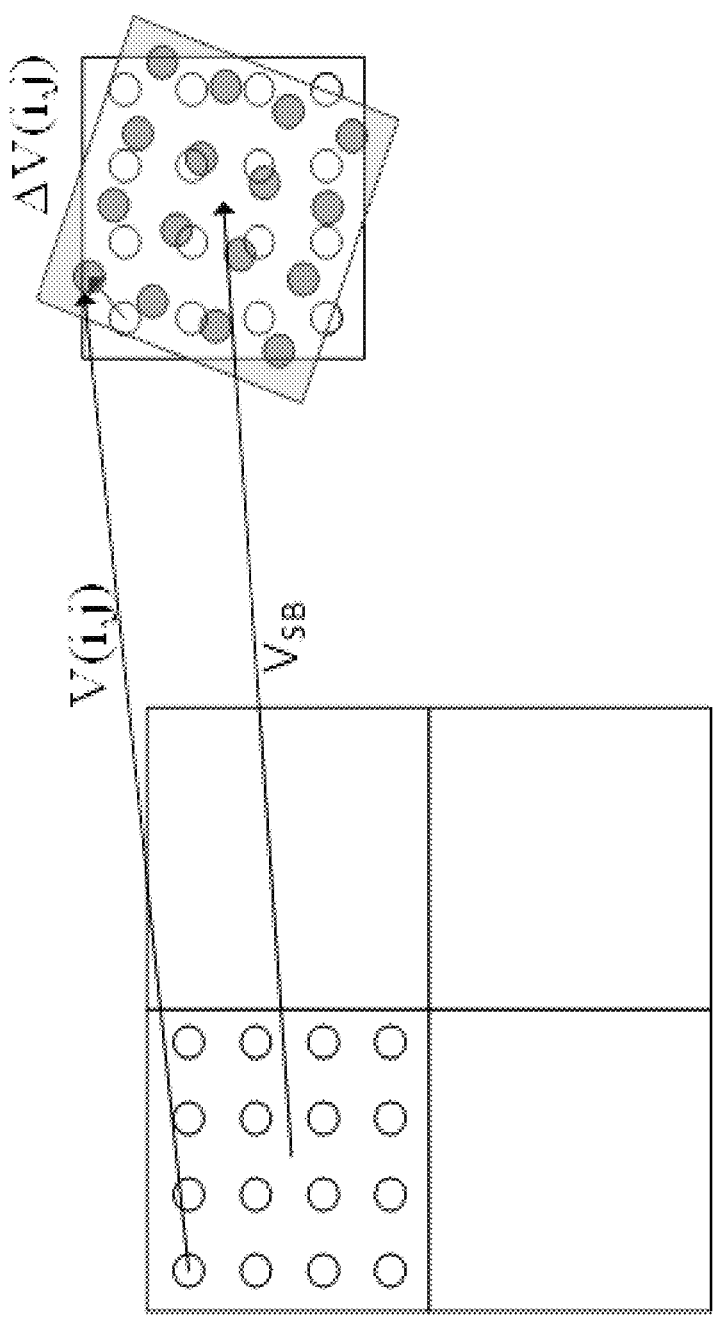
FIG. 10 shows an example of sub-block MV $V_{SB}$ and pixel $\Delta v(i,j)$ (red arrow)

Step 3) The luma prediction refinement is calculated by the optical flow equation.

$$\Delta I(i,j)=g_x(i,j)*\Delta v_x(i,j)+g_y(i,j)*\Delta v_y(i,j)$$

where the Δv(i,j) is the difference between pixel MV computed for sample location (i,j), denoted by v(i,j), and the sub-block MV of the sub-block to which pixel (i,j) belongs, as shown in FIG. 10.

FIG. 10 shows an example of a sub-block MV $V_{SB}$ and pixel Δv(i,j) (red arrow)

Since the affine model parameters and the pixel location relative to the sub-block center are not changed from sub-block to sub-block, Δv(i,j) can be calculated for the first sub-block, and reused for other sub-blocks in the same CU. Let x and y be the horizontal and vertical offset from the pixel location to the center of the sub-block, Δv(x, y) can be derived by the following equation, $$\begin{cases} \Delta v_x(x,y) = c*x + d*y \\ \Delta v_y(x,y) = e*x + f*y \end{cases}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction I(i,j). The final prediction I' is generated as the following equation.

$$I'(i,j) = I(i,j) + \Delta I(i,j)$$

2.8 Spec for PROF in VVC

Spec of PROF (in JVET-O0070-CE4.2.1a-WD-r4) is as follows:
8.5.5.9 Derivation Process for Motion Vector Arrays from Affine Control Point Motion Vectors
Inputs to this process are:
- a luma location (xCb, yCb) of the top-left sample of the current luma coding block relative to the top-left luma sample of the current picture,
- two variables cbWidth and cbHeight specifying the width and the height of the luma coding block,
- the number of control point motion vectors numCpMv,
- the control point motion vectors cpMvLX[cpIdx], with cpIdx=0 . . . numCpMv−1 and X being 0 or 1,
- the reference index refIdxLX and X being 0 or 1,
- the number of luma coding subblocks in horizontal direction numSbX and in vertical direction numSbY.

Outputs of this process are:
- the luma subblock motion vector array mvLX[xSbIdx][ySbIdx] with xSbIdx=0 . . . numSbX−1, ySbIdx=0 numSbY−1 and X being 0 or 1,
- the chroma subblock motion vector array mvCLX[xSbIdx][ySbIdx] with xSbIdx=0 . . . numSbX−1, ySbIdx=0 numSbY−1 and X being 0 or 1.
- the prediction refinement utilization flag cbProfFlagLX and X being 0 or 1.
- the motion vector difference array diffMvLX[xIdx][yIdx] with xIdx=0 . . . cbWidth/numSbX−1, yIdx=0 . . . cbHeight/numSbY−1 and X being 0 or 1.

The following assignments are made for x=xCb . . . xCb+cbWidth−1 and y=yCb . . . yCb+cbHeight−1:

$$\text{CpMv}LX[x][y][0] = \text{cpMv}LX[0] \quad (8\text{-}666)$$

$$\text{CpMv}LX[x][y][1] = \text{cpMv}LX[1] \quad (8\text{-}667)$$

$$\text{CpMv}LX[x][y][2] = \text{cpMv}LX[2] \quad (8\text{-}668)$$

The variables log 2CbW and log 2CbH are derived as follows:

$$\log 2\text{Cb}W = \text{Log } 2(\text{cbWidth}) \quad (8\text{-}669)$$

$$\log 2\text{Cb}H = \text{Log } 2(\text{cbHeight}) \quad (8\text{-}670)$$

The variables mvScaleHor, mvScaleVer, dHorX and dVerX are derived as follows:

$$\text{mvScaleHor} = \text{cpMv}LX[0][0] << 7 \quad (8\text{-}671)$$

$$\text{mvScaleVer} = \text{cpMv}LX[0][1] << 7 \quad (8\text{-}672)$$

$$d\text{HorX} = (\text{cpMv}LX[1][0] - \text{cpMv}LX[0][0]) << (7 - \log 2\text{Cb}W) \quad (8\text{-}673)$$

$$d\text{VerX} = (\text{cpMv}LX[1][1] - \text{cpMv}LX[0][1]) << (7 - \log 2\text{Cb}W) \quad (8\text{-}674)$$

The variables dHorY and dVerY are derived as follows:
If numCpMv is equal to 3, the following applies:

$$d\text{HorY} = (\text{cpMv}LX[2][0] - \text{cpMv}LX[0][0]) << (7 - \log 2\text{Cb}H) \quad (8\text{-}675)$$

$$d\text{VerY} = (\text{cpMv}LX[2][1] - \text{cpMv}LX[0][1]) << (7 - \log 2\text{Cb}H) \quad (8\text{-}676)$$

Otherwise (numCpMv is equal to 2), the following applies:

$$d\text{HorY} = -d\text{VerX} \quad (8\text{-}677)$$

$$d\text{VerY} = d\text{HorX} \quad (8\text{-}678)$$

The variable fallbackModeTriggered is set equal to 1 and modified as follows:
The variables $bxWX_4$, $bxHX_4$, $bxWX_h$, $bxHX_h$, $bxWX_v$ and $bxHX_v$ are derived as follows:

$$\max W_4 = \text{Max}(0, \text{Max}(4*(2048 + d\text{HorX}), \text{Max}(4*d\text{HorY}, 4*(2048 + d\text{HorX}) + 4*d\text{HorY}))) \quad (8\text{-}679)$$

$$\min W_4 = \text{Min}(0, \text{Min}(4*(2048 + d\text{HorX}), \text{Min}(4*d\text{HorY}, 4*(2048 + d\text{HorX}) + 4*d\text{HorY}))) \quad (8\text{-}680)$$

$$\max H_4 = \text{Max}(0, \text{Max}(4*d\text{VerX}, \text{Max}(4*(2048 + d\text{VerY}), 4*d\text{VerX} + 4*(2048 + d\text{VerY})))) \quad (8\text{-}681)$$

$$\min H_4 = \text{Min}(0, \text{Min}(4*d\text{VerX}, \text{Min}(4*(2048 + d\text{VerY}), 4*d\text{VerX} + 4*(2048 + d\text{VerY})))) \quad (8\text{-}682)$$

$$bxWX_4 = ((\max W_4 - \min W_4) >> 11) + 9 \quad (8\text{-}683)$$

$$bxHX_4 = ((\max H_4 - \min H_4) >> 11) + 9 \quad (8\text{-}684)$$

$$bxWX_h = ((\text{Max}(0, 4*(2048 + d\text{HorX})) - \text{Min}(0, 4*(2048 + d\text{HorX}))) >> 11) + 9 \quad (8\text{-}685)$$

$$bxHX_h = ((\text{Max}(0, 4*d\text{VerX}) - \text{Min}(0, 4*d\text{VerX})) >> 11) + 9 \quad (8\text{-}686)$$

$$bxWX_v = ((\text{Max}(0, 4*d\text{HorY}) - \text{Min}(0, 4*d\text{HorY})) >> 11) + 9 \quad (8\text{-}687)$$

$$bxHX_v = ((\text{Max}(0, 4*(2048 + d\text{VerY})) - \text{Min}(0, 4*(2048 + d\text{VerY}))) >> 11) + 9 \quad (8\text{-}688)$$

If inter_pred_idc[xCb][yCb] is equal to PRED_BI and $bxWX_4 * bxHX_4$ is less than or equal to 225, fallbackModeTriggered is set equal to 0.
Otherwise, if both $bxWX_h * bxHX_h$ is less than or equal to 165 and $bxWX_v * bxHX_v$ is less than or equal to 165, fallbackModeTriggered is set equal to 0.

For xSbIdx=0 ... numSbX−1 and ySbIdx=0 ... numSbY−1, the following applies:
　The variables xPosCb and yPosCb are derived as follows
　　If fallbackModeTriggered is equal to 1, the following applies:

$$xPosCb=(cbWidth>>1) \quad (8\text{-}689)$$

$$yPosCb=(cbHeight>>1) \quad (8\text{-}690)$$

Otherwise (fallbackModeTriggered is equal to 0), the following applies:

$$xPosCb=2+(xSbIdx<<2) \quad (8\text{-}691)$$

$$yPosCb=2+(ySbIdx<<2) \quad (8\text{-}692)$$

The luma motion vector mvLX[xSbIdx][ySbIdx] is derived as follows:

$$mvLX[xSbIdx][ySbIdx][0]=(mvScaleHor+dHorX*xPosCb+dHorY*yPosCb) \quad (8\text{-}693)$$

$$mvLX[xSbIdx][ySbIdx][1]=(mvScaleVer+dVerX*xPosCb+dVerY*yPosCb) \quad (8\text{-}694)$$

The rounding process for motion vectors as specified in clause 8.5.2.14 is invoked with mvX set equal to mvLX[xSbIdx][ySbIdx], rightShift set equal to 7, and leftShift set equal to 0 as inputs and the rounded mvLX[xSbIdx][ySbIdx] as output.
　The motion vectors mvLX[xSbIdx][ySbIdx] are clipped as follows:

$$mvLX[xSbIdx][ySbIdx][0]=Clip3(-2^{17},2^{17}-1,mvLX[xSbIdx][ySbIdx][0]) \quad (8\text{-}695)$$

$$mvLX[xSbIdx][ySbIdx][1]=Clip3(-2^{17},2^{17}-1,mvLX[xSbIdx][ySbIdx][1]) \quad (8\text{-}696)$$

For xSbIdx=0 ... numSbX−1 and ySbIdx=0 ... numSbY−1, the following applies:
　The average luma motion vector mvAvgLX is derived as follows:

$$mvAvgLX=mvLX[(xSbIdx>>1<<1)][(ySbIdx>>1<<1)]+mvLX[(xSbIdx>>1<<1)+1][(ySbIdx>>1<<1)+1] \quad (8\text{-}697)$$

$$mvAvgLX[0]=(mvAvgLX[0]+1-(mvAvgLX[0]>=0))>>1 \quad (8\text{-}698)$$

$$mvAvgLX[1]=(mvAvgLX[1]+1-(mvAvgLX[1]>=0))>>1 \quad (8\text{-}699)$$

The derivation process for chroma motion vectors in clause 8.5.2.13 is invoked with mvAvgLX and refIdxLX as inputs, and the chroma motion vector mvCLX[xSbIdx][ySbIdx] as output.
　　[This way four 2×2 chroma subblocks (4×4 chroma block) share the same motion vector which is derived from the average of two 4×4 luma subblock motion vectors. In the decoding process motion compensation is still performed on 2×2 chroma blocks which is however a motion compensation on a chroma 4×4 block because all chroma MVs inside a 4×4 chroma block are the same.]
　The variable cbProfFlagLX is derived as follows:
　　If one or more of the following conditions are true, cbProfFlagLX is set equal to FALSE.
　　　affine_prof_enabled_flag is equal to 0.
　　　fallbackModeTriggered is equal to 1.
　　　numCpMv is equal to 2 and cpMvLX[1][0] is equal to cpMvLX[0][0] and cpMvLX[1][1] is equal to cpMvLX[0][1].
　　　numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].
　　Otherwise, cbProfFlagLX set equal to TRUE.
If cbProfFlagLX is 1, the motion vector difference array diffMv is derived as follows:
　The variables sbWidth and sbHeight are derived as follows:

$$sbWidth=cbWidth/numSbX$$

$$sbHeight=cbHeight/numSbY$$

The variable shift1 is set to equal to Max (6, bitDepth−6).
　The variable dmvLimit is set to equal to 1<<shift1.
　The variable posOffsetX and posOffsetY is derived as follows:

$$posOffsetX=6*dHorX+6*dVerX$$

$$posOffsetY=6*dHorY+6*dVerY$$

For x=0 ... sbWidth−1 and y=0 ... sbHeight−1, the following applies:
　The following applies:

$$diffMv[x][y][0]=x*(dHorX<<2)+y*(dVerX<<2)-posOffsetX$$

$$diffMv[x][y][1]=x*(dHorY<<2)+y*(dVerY<<2)-posOffsetY$$

For i=0 ... 1, the following applies:
　　The rounding process for motion vectors as specified in clause 8.5.2.14 is invoked with mvX set equal to diffMv[x][y][i], rightShift set equal to 7, and leftShift set equal to 0 as inputs and the rounded diffMv as output.
　　diffMv[x][y][i] is clipped as followings:

$$diffMv[x][y][i]=Clip3(-dmvLimit,dmvLimit-1,diffMv[x][y][i])$$

2.9 Symmetric MVD Coding

In VTM5, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1. At slice level, variables BiDirPredFlag, RefIdxSymL0 and RefIdxSymL1 are derived as follows:
　If mvd_l1_zero_flag is 1, BiDirPredFlag is set equal to 0.
　Otherwise, if the nearest reference picture in list-0 and the nearest reference picture in list-1 form a forward and backward pair of reference pictures or a backward and forward pair of reference pictures, BiDirPredFlag is set to 1. Otherwise BiDirPredFlag is set to 0.

2. At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

Figure 11:
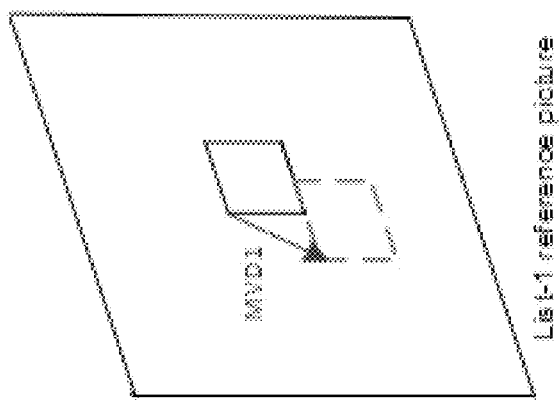
FIG. 11 is an example illustration of symmetrical MVD mode.
Figure 11:
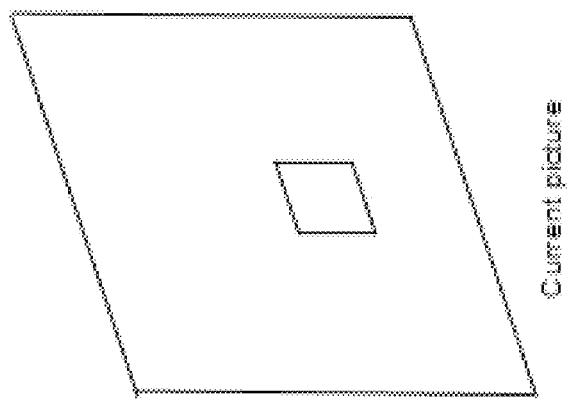
Figure 11:
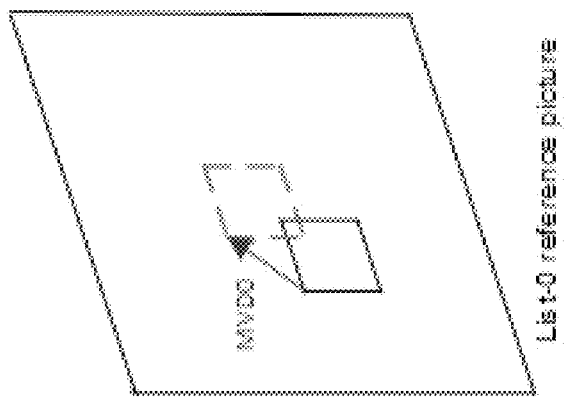

FIG. 11 is an illustration for symmetrical MVD mode

In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

Figure 12:
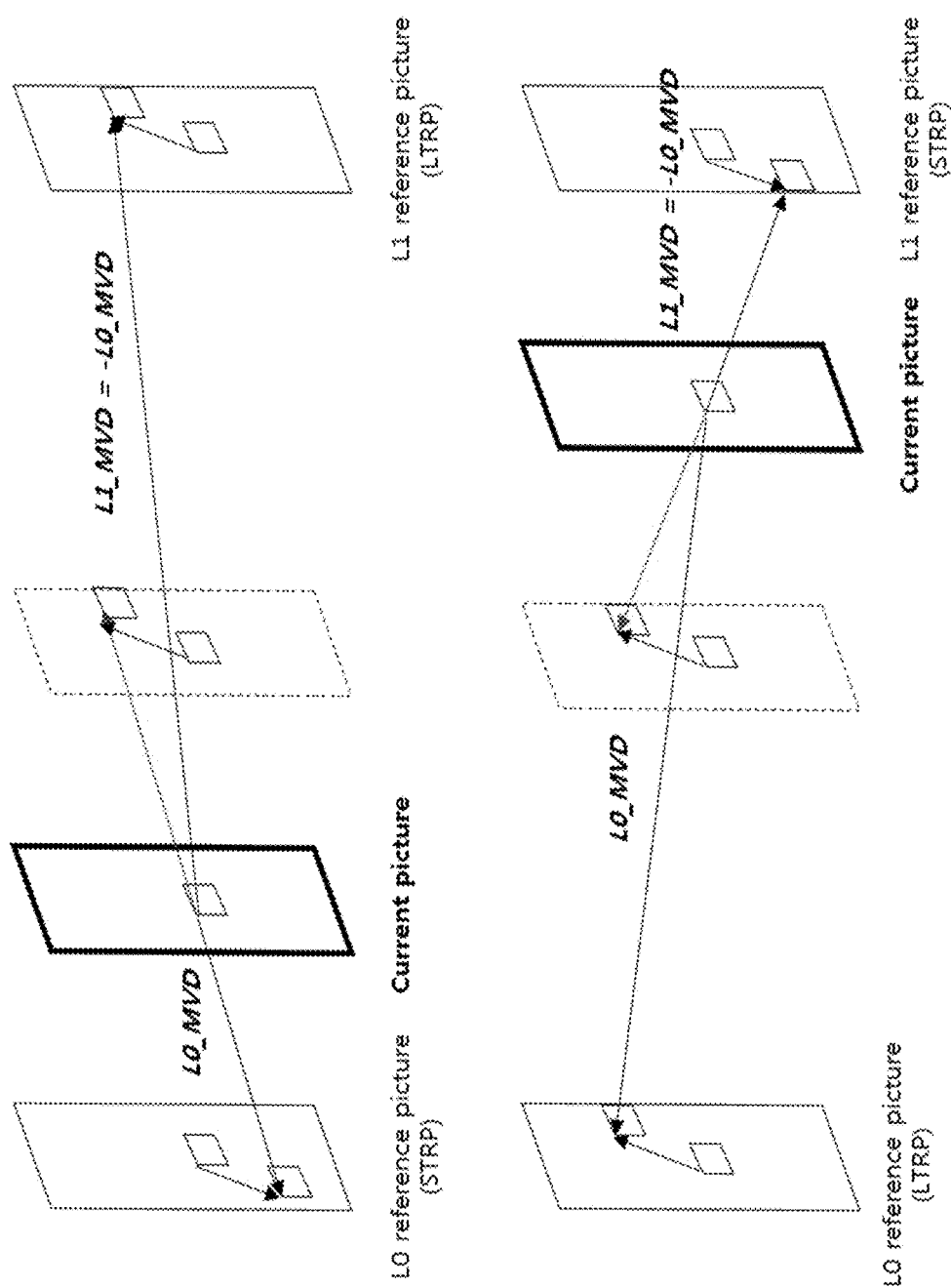
FIG. 12 shows examples on usage of the mixed STRP and LTRP.

2.10 JVET-O0414: Symmetric-MVD Control Considering the Reference Picture Type The reference picture type is determined as "short-term reference picture (STRP)" or "long-term reference picture (LTRP)". Both STRP and LTRP can be used as a reference picture for current block. FIG. 12 depicts examples on usage of the mixed STRP and LTRP in SMVD scheme. Using the mirrored L0_MVD as L1_MVD can be inaccurate when reference picture type of the L0 and L1 are different, because the distance difference (distance between reference picture 0 and current picture and distance between reference picture 1 and current picture) is larger, correlation of the motion vector in each direction can be lower.

FIG. 12 shows examples on usage of the mixed STRP and LTRP.

In current working draft, sym_mvd_flag parsing process is as follows, i.e., availability of the reference pictures are checked and if the conditions are satisfied, sym_mvd_flag is parsed. If sym_mvd_flag is true, MVD of the L1 (MvdL1) is derived as mirrored MvdL0.

Also, in current scheme, RefIdxSymLX with X=0, 1 is derived as follows. RefIdxSymL0 is the closest reference picture with POC smaller than POC of the current picture and RefIdxSymL1 is the closest reference picture with POC larger than the POC of the current picture.

In JVET-O0414, two schemes are proposed considering the reference picture type to enhance the accuracy of the MVD when the SMVD scheme is used. Comparisons among the current SMVD scheme and two proposed schemes are briefly shown in Table 5. In here, MVD means the MVD of the List 0.

TABLE 5

Current SMVD scheme and proposed schemes

|  |  | SMVD |  | Proposed scheme I |  | Proposed scheme II |  |
|---|---|---|---|---|---|---|---|
| L0 | L1 | L0 MVD | L1 MVD | L0 MVD | L1 MVD | L0 MVD | L1 MVD |
| short | short | MVD | (−1) MVD | MVD | (−1) MVD | MVD | (−1) MVD |
| long | long | MVD | (−1) MVD | MVD | (−1) MVD |  |  |
| short | long | MVD | (−1) MVD |  |  |  |  |
| long | short | MVD | (−1) MVD |  |  |  |  |

Proposed Scheme I

In the proposed scheme I, SMVD process is restricted when the current picture has mixed reference picture types.

Proposed Scheme II

For proposed scheme II, long-term reference pictures are excluded in the reference picture checking process, therefore, only short-term reference pictures can be considered for SMVD.

3. Examples of Technical Problems Addressed by Some Embodiments

The current design of DMVR/BDOF/MMVD/PROF do not consider the reference picture type, the effectiveness may be affected.

4. Example Embodiments

The description below should be considered as examples to explain some concepts. These descriptions should not be interpreted in a narrow way. Furthermore, these techniques can be combined in any manner.

Hereinafter, DMVD is used to represent the decoder-side motion vector derivation method, such as BDOF, DMVR, template-based motion estimation, FRUC etc.

1. Whether to enable or disable a coding tool or how to apply a coding tool for a block may depend on the reference picture types (e.g., long-term or short term) of the block and/or resolutions of reference pictures and/or resolution of current picture.

a. In one example, when at least two reference pictures (e.g., two reference pictures for bi-prediction) used by the block are associated with different reference picture types, the coding tool is disabled for the block.

i. Alternatively, furthermore, if all of them are long-term reference pictures, the checking of POC distances of each of the reference picture relative to the current picture is omitted. That is, in one example, the coding tool may be enabled regardless of the POC distances.

b. In one example, when at least two reference pictures (e.g., two reference pictures for bi-prediction) used by the block are associated with same reference picture type, the coding tool may be enabled for the block.

i. In one example, the same reference picture type is long-term or short-term reference picture type or same absolute POC distances of each of the reference picture relative to the current picture.

c. In one example, when some or all reference pictures (e.g., two reference pictures for bi-prediction) used by the block are associated with same reference picture type which is equal to type X, the coding tool may be enabled for the block.

i. In one example, type X is the short-term reference picture type.

ii. Alternatively, furthermore, if none of them is associated with type X, the coding tools may be disabled.

iii. Alternatively, furthermore, if some of them is associated with type Y (unequal to X), the coding tools may be disabled.

iv. In one example, type X may not be Adaptive Resolution Picture (ARP). For example, the resolution of the reference picture with type X is same with the resolution of the current picture.

v. In one example, type X may be same absolute POC distances of each of the reference picture relative to the current picture.
d. Alternatively, when one of reference pictures or all of reference pictures used by the block are associated with same reference picture type which is equal to type X, the coding tool is disabled for the block.
   i. In one example, type X is the long-term reference picture type.
   ii. In one example, type X may be Adaptive Resolution Picture (ARP). For example, the resolution of the reference picture with type X is different from the resolution of the current picture.
e. Alternatively, the coding tool may be only applied to the reference pictures of a typical reference picture type X.
   i. In one example, type X is the short-term reference picture type.
   ii. In one example, type X may not be Adaptive Resolution Picture (ARP). For example, the resolution of the reference picture with type X is same with the resolution of the current picture.
   iii. In one example, type X may be same absolute POC distances of each of the reference picture relative to the current picture.
f. In one example, the coding tool is the BDOF coding tool.
g. In one example, the coding tool is the DMVR coding tool.
h. In one example, the coding tool is the MMVD coding tool.
i. In one example, the coding tool is the PROF coding tool.
j. In one example, the coding tool is the Affine coding tool.
k. In one example, the coding tool is the Combined Inter-Intra Prediction (CIIP) coding tool.
l. In one example, the coding tool is the Adaptive Motion Vector Resolution (AMVR) coding tool.
m. In one example, the coding tool is the Triangle Partition Mode (TPM) coding tool.
n. In one example, the coding tool is the SMVD coding tool.
o. In one example, the coding tool is the switchable interpolation filtering coding tool.
p. In one example, the coding tool is the BCW (i.e., Bi-prediction with CU-level Weights) coding tool.
q. In one example, the coding tool is a coding tool which refines the motion information of a block based on coded information, such as DMVD (e.g., including template matching based methods).
r. In one example, the coding tool is a coding tool which refines the prediction signals of a block based on coded information (e.g., coding methods with optical flow).
2. Enabling/disabling BDOF may be dependent on the reference picture types.
   a. In one example, when all reference pictures are with the same reference picture type, BDOF may be enabled. That is, if two of them are with different types, BDOF may be disabled.
      i. In one example, BDOF may be enabled when both the reference picture in the past (e.g., with smaller POC value compared to current picture) and the reference picture in the future (e.g., with greater POC value compared to current picture) are long-term or short-term reference pictures or same absolute POC distances of each of the reference picture relative to the current picture.
   b. In one example, when all reference pictures are with the same reference picture type X, BDOF may be enabled.
      i. In one example, BDOF may be enabled when both the reference picture in the past and the reference picture in the future are short-term reference pictures.
      ii. In one example, type X is the short-term reference picture type.
      iii. In one example, type X may not be Adaptive Resolution Picture (ARP). For example, the resolution of the reference picture with type X is same from the resolution of the current picture.
      iv. Alternatively, furthermore, at least one of the reference pictures is not with type X, BDOF may be disabled.
      v. In one example, type X may be same absolute POC distances of each of the reference picture relative to the current picture.
3. Enabling/disabling DMVR may be dependent on the reference picture types.
   a. In one example, when all reference pictures are with the same reference picture type, DMVR may be enabled. That is, if two of them are with different types, DMVR may be disabled.
      i. In one example, DMVR may be enabled when both the reference picture in the past (e.g., with smaller POC value compared to current picture) and the reference picture in the future (e.g., with greater POC value compared to current picture) are long-term or short-term reference pictures or same absolute POC distances of each of the reference picture relative to the current picture.
   b. In one example, when all reference pictures are with the same reference picture type X, DMVR may be enabled.
      i. In one example, DMVR may be enabled when both the reference picture in the past and the reference picture in the future are short-term reference pictures.
      ii. In one example, type X is the short-term reference picture type.
      iii. In one example, type X may not be Adaptive Resolution Picture (ARP). For example, the resolution of the reference picture with type X is same from the resolution of the current picture.
      iv. Alternatively, furthermore, at least one of the reference pictures is not with type X, DMVR may be disabled.
      v. In one example, type X may be same absolute POC distances of each of the reference picture relative to the current picture.
   c. In one example, if all reference pictures are with the same reference picture type Y, the checking of POC distances of each of the reference picture relative to the current picture is omitted. That is, DMVR may be enabled regardless of the POC distances.
      i. In one example, type Y is the long-term reference picture type.
4. Whether MMVD/BCW/PROF/TPM/SMVD/Affine is enabled or not or how to apply MMVD/BCW/PROF/TPM/SMVD/Affine may be dependent on the reference picture types.
   a. In one example, if all reference pictures are with the same reference picture type, MMVD/BCW/PROF/

TPM/SMVD/Affine may be enabled; otherwise, MMVD/BCW/PROF/TPM/SMVD/Affine may be disabled.
  b. In one example, if all reference pictures are with the reference picture type X, MMVD/BCW/PROF/TPM/SMVD/Affine may be enabled.
    i. In one example, type X is the short-term reference picture type.
    ii. In one example, type X may be same absolute POC distances of each of the reference picture relative to the current picture.
  c. In one example, such restriction may be applied to bi-directional predicted blocks.
  d. In one example, such restriction may be applied to uni-directional predicted blocks.
  e. In one example, such restriction may be applied to both bi-directional predicted blocks and uni-directional predicted blocks.
  f. In one example, when MMVD/BCW/TPM/SMVD/Affine is disabled, indication of whether MMVD/BCW/TPM/SMVD/Affine is applied or not may not be signaled.
    i. Alternatively, such indication is still signaled. However, for a conformance bitstream, the indication shall always be false, i.e., MMVD/BCW/TPM/SMVD/Affine shall be disabled.
5. The "reference type" of a reference picture disclosed in the document may be determined by judging:
  a. A reference picture is long term or short term.
  b. The original resolution of a reference picture is identical to the current picture or not.
  c. The POC distance between a reference picture and the current picture is in a certain range.
  d. The temporal layer of a reference picture is in a certain range.
  e. Whether certain coding tools are applied on a reference picture or not.

Simplify MVD Derivation for MMVD
6. MVD scaling may be removed for MMVD. If the selected MV basis (or base merge candidate) in MMVD mode is a bi-directional MV, MVD of prediction direction X (X=0 or 1) is set equal to the signaled MVD directly and MVD of prediction direction Y (Y=1−X) may be set equal to the signaled MVD or the opposite value of the signaled MVD.
  a. In one example, if both reference pictures identified by the MV basis have larger or smaller POC than the current picture, MVD of prediction direction Y may be set equal to the signaled MVD.
  b. In one example, if one reference picture identified by the MV basis has larger POC than the current picture and the other reference picture identified by the MV basis has smaller POC than the current picture, MVD of prediction direction Y may be set equal to the opposite value of the signaled MVD.
7. In MMVD, MVD may be always signaled for prediction direction X (X=0 or 1) and may be derived for prediction direction Y (Y=1−X) if necessary (e.g., if the MV basis is a bi-directional MV).
  a. In one example, if the MV basis is a uni-directional MV, X may be set equal to the prediction direction of the MV basis.
  b. In one example, if the MV basis is a bi-directional MV, X may be set equal to 0 or 1.
  c. In one example, MVD of reference picture list Y may be derived dependent on the reference picture type (e.g., long-term reference picture or short-term reference picture) of the two reference pictures identified by the MV basis.
    i. In one example, if both reference pictures are short-term reference pictures, MVD of prediction direction Y may be derived by scaling the signaled MVD according to the POC distance between the two reference pictures and the current picture.
    ii. In one example, if the two reference pictures both have larger or smaller POC than the current picture, MVD of prediction direction Y may be set equal to the signaled MVD.
      (i) Alternatively, furthermore, such derivation method may be applied only when at least one of the reference pictures are not a short-term reference picture.
    iii. In one example, if one reference picture has larger POC than the current picture and the other reference picture has smaller POC than the current picture, MVD of prediction direction Y may be set equal to the opposite value of the signaled MVD.
      (i) Alternatively, furthermore, such derivation method may be applied only when at least one of the reference pictures are not a short-term reference picture.

5. Embodiment

Deleted parts are marked with double brackets (e.g., [[a]] denotes the deletion of the character "a"), and newly added parts are highlighted in Italic and bold.

5.1 Embodiment #1 on BDOF

BDOF may be enabled only when both the reference picture in the past and the reference picture in the future are long-term or short-term reference pictures.
8.5.6.1 General
This process is invoked when decoding a coding unit coded in inter prediction mode.
Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  variables numSbX and numSbY specifying the number of luma coding subblocks in horizontal and vertical direction,
  the motion vectors mvL0[xSbIdx][ySbIdx] and myL1[xSbIdx][ySbIdx] with xSbIdx=0 . . . numSbX−1, and ySbIdx=0 . . . numSbY−1,
  the refined motion vectors refMvL0[xSbIdx][ySbIdx] and refMvL1[xSbIdx][ySbIdx] with xSbIdx=0 . . . numSbX−1, and ySbIdx=0 . . . numSbY−1,
  the reference indices refIdxL0 and refIdxL1,
  the prediction list utilization flags predFlagL0[xSbIdx][ySbIdx] and predFlagL1[xSbIdx][ySbIdx] with xSbIdx=0 . . . numSbX−1, and ySbIdx=0 . . . numSbY−1,
  the bi-prediction weight index bcwIdx,
  a variable cIdx specifying the colour component index of the current block.

Outputs of this process are:
    an array predSamples of prediction samples.
Let predSamplesL0$_L$, predSamplesL1$_L$ and predSamplesIntra$_L$ be (cbWidth)×(cbHeight) arrays of predicted luma sample values and, predSamplesL0$_{Cb}$, predSamplesL1$_{Cb}$, predSamplesL0$_{Cr}$, and predSamplesL1$_{Cr}$, predSamplesIntra$_{Cb}$, and predSamplesIntra$_{Cr}$ be (cbWidth/SubWidthC)×(cbHeight/SubHeightC) arrays of predicted chroma sample values.
    The variable currPic specifies the current picture and the variable bdofFlag is derived as follows:
        If all of the following conditions are true, bdofFlag is set equal to TRUE.
            sps_bdof_enabled_flag is equal to 1.
            predFlagL0[xSbIdx][ySbIdx] and predFlagL1[xSbIdx][ySbIdx] are both equal to 1.
            DiffPicOrderCnt(currPic, RefPicList[0][refIdxL0]) DiffPicOrderCnt(currPic, RefPicList[1][refIdxL1]) is less than 0.
            RefPicList[0][refIdxL0] and RefPicList[1][refIdxL1] are both long-term or short-term reference pictures
            MotionModelIdc[xCb][yCb] is equal to 0.
            merge_subblock_flag[xCb][yCb] is equal to 0.
            sym_mvd_flag[xCb][yCb] is equal to 0.
            BcwIdx[xCb][yCb] is equal to 0.
            luma_weight_l0_flag[refIdxL0] and luma_weight_l1_flag[refIdxL1] are both equal to 0.
            cbHeight is greater than or equal to 8
            cIdx is equal to 0.
        Otherwise, bdofFlag is set equal to FALSE.
. . .

5.2 Embodiment #2 on BDOF

BDOF may be enabled only when both the reference picture in the past and the reference picture in the future are short-term reference pictures.
8.5.6.1 General
This process is invoked when decoding a coding unit coded in inter prediction mode.
Inputs to this process are:
    a luma location (xCb, yCb) specifying the top-left sample of the current coding block relative to the top-left luma sample of the current picture,
    a variable cbWidth specifying the width of the current coding block in luma samples,
    a variable cbHeight specifying the height of the current coding block in luma samples,
    variables numSbX and numSbY specifying the number of luma coding subblocks in horizontal and vertical direction,
    the motion vectors mvL0[xSbIdx][ySbIdx] and myL1[xSbIdx][ySbIdx] with xSbIdx=0 . . . numSbX−1, and ySbIdx=0 . . . numSbY−1,
    the refined motion vectors refMvL0[xSbIdx][ySbIdx] and refMvL1[xSbIdx][ySbIdx] with xSbIdx=0 . . . numSbX−1, and ySbIdx=0 . . . numSbY−1,
    the reference indices refIdxL0 and refIdxL1,
    the prediction list utilization flags predFlagL0[xSbIdx][ySbIdx] and predFlagL1[xSbIdx][ySbIdx] with xSbIdx=0 . . . numSbX−1, and ySbIdx=0 . . . numSbY−1,
    the bi-prediction weight index bcwIdx,
    a variable cIdx specifying the colour component index of the current block.

Outputs of this process are:
    an array predSamples of prediction samples.
Let predSamplesL0$_L$, predSamplesL1$_L$ and predSamplesIntra$_L$ be (cbWidth)×(cbHeight) arrays of predicted luma sample values and, predSamplesL0$_{Cb}$, predSamplesL1$_{Cb}$, PredSamplesL0$_{Cr}$ and predSamplesL1$_{Cr}$, predSamplesIntra$_{Cb}$, and predSamplesIntra$_{Cr}$ be (cbWidth/SubWidthC)×(cbHeight/SubHeightC) arrays of predicted chroma sample values.
    The variable currPic specifies the current picture and the variable bdofFlag is derived as follows:
        If all of the following conditions are true, bdofFlag is set equal to TRUE.
            sps_bdof_enabled_flag is equal to 1.
            predFlagL0[xSbIdx][ySbIdx] and predFlagL1[xSbIdx][ySbIdx] are both equal to 1.
            DiffPicOrderCnt(currPic, RefPicList[0][refIdxL0]) DiffPicOrderCnt(currPic, RefPicList[1][refIdxL1]) is less than 0.
            RefPicList[0][refIdxL0] and RefPicList[1][refIdxL1] are both short-term reference pictures
            MotionModelIdc[xCb][yCb] is equal to 0.
            merge_subblock_flag[xCb][yCb] is equal to 0.
            sym_mvd_flag[xCb][yCb] is equal to 0.
            BcwIdx[xCb][yCb] is equal to 0.
            luma_weight_l0_flag[refIdxL0] and luma_weight_l1_flag[refIdxL1] are both equal to 0.
            cbHeight is greater than or equal to 8
            cIdx is equal to 0.
        Otherwise, bdofFlag is set equal to FALSE.
. . .

5.3 Embodiment #3 on DMVR

DMVR may be enabled only when both the reference picture in the past and the reference picture in the future are long-term or short-term reference pictures.
8.5.1 General Decoding Process for Coding Units Coded in Inter Prediction Mode
Inputs to this process are:
    a luma location (xCb, yCb) specifying the top-left sample of the current coding block relative to the top-left luma sample of the current picture,
    a variable cbWidth specifying the width of the current coding block in luma samples,
    a variable cbHeight specifying the height of the current coding block in luma samples,
    a variable treeType specifying whether a single or a dual tree is used and if a dual tree is used, it specifies whether the current tree corresponds to the luma or chroma components.
Output of this process is a modified reconstructed picture before in-loop filtering.
The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.
The decoding process for coding units coded in inter prediction mode consists of the following ordered steps:
    1. The variable dmvrFlag is set equal to 0.
    2. The motion vector components and reference indices of the current coding unit are derived as follows:
        If MergeTriangleFlag[xCb][yCb], inter_affine_flag[xCb][yCb] and merge_subblock_flag[xCb][yCb] are all equal to 0, the following applies:
            The derivation process for motion vector components and reference indices as specified in clause 8.5.2.1 is invoked with the luma coding block location (xCb, yCb), the luma coding block width cbWidth and the luma coding block height cbHeight as inputs, and the luma motion vectors mvL0 [0][0] and mvL1[0][0], the reference indices refIdxL0 and refIdxL1 and the prediction list utilization flags predFlagL0[0][0] and predFlagL1[0][0], and the bi-prediction weight index bcwIdx as outputs.

When all of the following conditions are true, dmvrFlag is set equal to 1:
sps_dmvr_enabled_flag is equal to 1
general_merge_flag[xCb][yCb] is equal to 1
both predFlagL0[0][0] and predFlagL1[0][0] are equal to 1
mmvd_merge_flag[xCb][yCb] is equal to 0
DiffPicOrderCnt(currPic, RefPicList[0][refIdxL0]) is equal to DiffPicOrderCnt(RefPicList[1][refIdxL1], currPic)
RefPicList[0][refIdxL0] and RefPicList[1][refIdxL1] are both long-term or short-term reference pictures
BcwIdx[xCb][yCb] is equal to 0
Both luma_weight_l0_flag[refIdxL0] and luma_weight_l1_flag[refIdxL1] are equal to 0
cbWidth is greater than or equal to 8
cbHeight is greater than or equal to 8
cbHeight*cbWidth is greater than or equal to 128

. . .

5.4 Embodiment #4 on DMVR

DMVR may be enabled only when both the reference picture in the past and the reference picture in the future are short-term reference pictures.

8.5.1 General Decoding Process for Coding Units Coded in Inter Prediction Mode

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in inter prediction mode consists of the following ordered steps:
1. The variable dmvrFlag is set equal to 0.
2. The motion vector components and reference indices of the current coding unit are derived as follows:
   If MergeTriangleFlag[xCb][yCb], inter_affine_flag[xCb][yCb] and merge_subblock_flag[xCb][yCb] are all equal to 0, the following applies:
   The derivation process for motion vector components and reference indices as specified in clause 8.5.2.1 is invoked with the luma coding block location (xCb, yCb), the luma coding block width cbWidth and the luma coding block height cbHeight as inputs, and the luma motion vectors mvL0 [0][0] and myL1[0][0], the reference indices refIdxL0 and refIdxL1 and the prediction list utilization flags predFlagL0[0][0] and predFlagL1[0][0], and the bi-prediction weight index bcwIdx as outputs.

When all of the following conditions are true, dmvrFlag is set equal to 1:
sps_dmvr_enabled_flag is equal to 1
general_merge_flag[xCb][yCb] is equal to 1
both predFlagL0[0][0] and predFlagL1[0][0] are equal to 1
mmvd_merge_flag[xCb][yCb] is equal to 0
DiffPicOrderCnt(currPic, RefPicList[0][refIdxL0]) is equal to DiffPicOrderCnt(RefPicList[1][refIdxL1], currPic)
RefPieList[0][refIdxL0] and RefPieList[1][refIdxL1] are both short-term reference pictures
BcwIdx[xCb][yCb] is equal to 0
Both luma_weight_l0_flag[refIdxL0] and luma_weight_l1_flag[refIdxL1] are equal to 0
cbWidth is greater than or equal to 8
cbHeight is greater than or equal to 8
cbHeight*cbWidth is greater than or equal to 128

. . .

5.5 Embodiment #5 on DMVR

For DMVR, one restriction "The distances (i.e. POC difference) from both reference pictures to the current picture are same" is modified as "The distances (i.e. POC difference) from both reference pictures to the current picture are same or both reference pictures are long-term".

8.5.1 General Decoding Process for Coding Units Coded in Inter Prediction Mode

Inputs to this process are:
- a luma location (xCb, yCb) specifying the top-left sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in inter prediction mode consists of the following ordered steps:
1. The variable dmvrFlag is set equal to 0.
2. The motion vector components and reference indices of the current coding unit are derived as follows:
   If MergeTriangleFlag[xCb][yCb], inter_affine_flag[xCb][yCb] and merge_subblock_flag[xCb][yCb] are all equal to 0, the following applies:
   The derivation process for motion vector components and reference indices as specified in clause 8.5.2.1 is invoked with the luma coding block location (xCb, yCb), the luma coding block width cbWidth and the luma coding block height cbHeight as inputs, and the luma motion vectors mvL0 [0][0] and myL1[0][0], the reference indices refIdxL0 and refIdxL1 and the prediction list utilization flags predFlagL0[0][0] and predFlagL1 [0][0], and the bi-prediction weight index bcwIdx as outputs.

When all of the following conditions are true, dmvr-Flag is set equal to 1:
sps_dmvr_enabled_flag is equal to 1
general_merge_flag[xCb][yCb] is equal to 1
both predFlagL0[0][0] and predFlagL1[0][0] are equal to 1
mmvd_merge_flag[xCb][yCb] is equal to 0
DiffPicOrderCnt(currPic, RefPicList[0][refIdxL0]) is equal to DiffPicOrderCnt(RefPicList[1][refIdxL1], currPic) or (RefPicList[0][refIdxL0] and RefPieList[1][refIdxL1] are both long-term reference pictures)
BcwIdx[xCb][yCb] is equal to 0
Both luma_weight_l0_flag[refIdxL0] and luma_weight_l1_flag[refIdxL1] are equal to 0
cbWidth is greater than or equal to 8
cbHeight is greater than or equal to 8
cbHeight*cbWidth is greater than or equal to 128

. . .

5.6 Embodiment #6 on MMVD

For bi-predicted blocks, MMVD may be enabled only when reference pictures of the block are both long-term or short-term reference pictures.
7.4.8.7 Merge Data Semantics
. . .
mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.
If the current coding block is a bi-predicted block, and one reference picture of the coding block is a short-term reference picture and the other reference picture of the coding block is a long-term reference picture, it is a requirement of bitstream conformance that the value of mmvd_merge_flag [x0][y0] be equal to 0.
When mmvd_merge_flag[x0][y0] is not present, it is inferred as follows:
 If all the following conditions are true, mmvd_merge_flag [x0][y0] is inferred to be equal to 1:
  sps_mmvd_enabled_flag is equal to 1.
  general_merge_flag[x0][y0] is equal to 1.
  cbWidth*cbHeight is equal to 32.
  regular_merge_flag[x0][y0] is equal to 0.
 Otherwise, mmvd_merge_flag[x0][y0] is inferred to be equal to 0.
. . .

5.7 Embodiment #7 on MMVD

For bi-predicted blocks, MMVD may be enabled only when reference pictures of the block are both short-term reference pictures.
7.4.8.7 Merge Data Semantics
. . .
mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.
If the current coding block is a bi-predicted block, and at least one of the two reference pictures of the coding block is the long-term reference picture, it is a requirement of bitstream conformance that the value of mmvd_merge_flag [x0][y0] be equal to 0.
When mmvd_merge_flag[x0][y0] is not present, it is inferred as follows:
 If all the following conditions are true, mmvd_merge_flag [x0][y0] is inferred to be equal to 1:
  sps_mmvd_enabled_flag is equal to 1.
  general_merge_flag[x0][y0] is equal to 1.
  cbWidth*cbHeight is equal to 32.
  regular_merge_flag[x0][y0] is equal to 0.
 Otherwise, mmvd_merge_flag[x0][y0] is inferred to be equal to 0.

. . .

5.8 Embodiment #8 on MMVD

MMVD may be enabled only when all of the reference pictures of the block are short-term reference pictures.
7.4.8.7 Merge Data Semantics
. . .
mmvd_merge_flag[x0][y0] equal to 1 specifies that merge mode with motion vector difference is used to generate the inter prediction parameters of the current coding unit. The array indices x0, y0 specify the location (x0, y0) of the top-left luma sample of the considered coding block relative to the top-left luma sample of the picture.
If at least one reference picture of the current coding block is the long-term reference picture, it is a requirement of bitstream conformance that the value of mmvd_merge_flag [x0][y0] be equal to 0.
When mmvd_merge_flag[x0][y0] is not present, it is inferred as follows:
 If all the following conditions are true, mmvd_merge_flag [x0][y0] is inferred to be equal to 1:
  sps_mmvd_enabled_flag is equal to 1.
  general_merge_flag[x0][y0] is equal to 1.
  cbWidth*cbHeight is equal to 32.
  regular_merge_flag[x0][y0] is equal to 0.
 Otherwise, mmvd_merge_flag[x0][y0] is inferred to be equal to 0.
. . .

5.9 Embodiment #9 on PROF

PROF may be enabled in prediction direction X (X=0 or 1) only when the reference picture in such prediction direction is a short-term reference picture.
The proposed changes are on top of JVET-O0070-CE4.2.1a-WD-r4.docx.
8.5.5.9 Derivation Process for Motion Vector Arrays from Affine Control Point Motion Vectors
Inputs to this process are:
 a luma location (xCb, yCb) of the top-left sample of the current luma coding block relative to the top-left luma sample of the current picture,
 two variables cbWidth and cbHeight specifying the width and the height of the luma coding block,
 the number of control point motion vectors numCpMv,
 the control point motion vectors cpMvLX[cpIdx], with cpIdx=0 . . . numCpMv−1 and X being 0 or 1,
 the reference index refIdxLX and X being 0 or 1,
 the number of luma coding subblocks in horizontal direction numSbX and in vertical direction numSbY.

Outputs of this process are:
- the luma subblock motion vector array myLX[xSbIdx][ySbIdx] with xSbIdx=0 . . . numSbX-1, ySbIdx=0 . . . numSbY-1 and X being 0 or 1,
- the chroma subblock motion vector array myCLX[xSbIdx][ySbIdx] with xSbIdx=0 . . . numSbX-1, ySbIdx=0 . . . numSbY-1 and X being 0 or 1.
- the prediction refinement utilization flag cbProfFlagLX and X being 0 or 1.
- the motion vector difference array diffMvLX[xIdx][yIdx] with xIdx=0 . . . cbWidth/numSbX-1, yIdx=0 . . . cbHeight/numSbY-1 and X being 0 or 1.

The following assignments are made for x=xCb . . . xCb+cbWidth-1 and y=yCb . . . yCb+cbHeight-1:

$$CpMvLX[x][y][0]=cpMvLX[0] \quad (8\text{-}666)$$

$$CpMvLX[x][y][1]=cpMvLX[1] \quad (8\text{-}667)$$

$$CpMvLX[x][y][2]=cpMvLX[2] \quad (8\text{-}668)$$

The variables log 2CbW and log 2CbH are derived as follows:

$$\log 2CbW = \text{Log } 2(cbWidth) \quad (8\text{-}669)$$

$$\log 2CbH = \text{Log } 2(cbHeight) \quad (8\text{-}670)$$

The variables mvScaleHor, mvScaleVer, dHorX and dVerX are derived as follows:

$$mvScaleHor = cpMvLX[0][0] << 7 \quad (8\text{-}671)$$

$$mvScaleVer = cpMvLX[0][1] << 7 \quad (8\text{-}672)$$

$$dHorX = (cpMvLX[1][0] - cpMvLX[0][0]) << (7 - \log 2CbW) \quad (8\text{-}673)$$

$$dVerX = (cpMvLX[1][1] - cpMvLX[0][1]) << (7 - \log 2CbW) \quad (8\text{-}674)$$

The variables dHorY and dVerY are derived as follows:
If numCpMv is equal to 3, the following applies:

$$dHorY = (cpMvLX[2][0] - cpMvLX[0][0]) << (7 - \log 2CbH) \quad (8\text{-}675)$$

$$dVerY = (cpMvLX[2][1] - cpMvLX[0][1]) << (7 - \log 2CbH) \quad (8\text{-}676)$$

Otherwise (numCpMv is equal to 2), the following applies:

$$dHorY = -dVerX \quad (8\text{-}677)$$

$$dVerY = dHorX \quad (8\text{-}678)$$

The variable fallbackModeTriggered is set equal to 1 and modified as follows:
The variables $bxWX_4$, $bxHX_4$, $bxWX_h$, $bxHX_h$, $bxWX_v$ and $bxHX_v$ are derived as follows:

$$\max W_4 = \text{Max}(0, \text{Max}(4*(2048+dHorX), \text{Max}(4*dHorY, 4*(2048+dHorX)+4*dHorY))) \quad (8\text{-}679)$$

$$\min W_4 = \text{Min}(0, \text{Min}(4*(2048+dHorX), \text{Min}(4*dHorY, 4*(2048+dHorX)+4*dHorY))) \quad (8\text{-}680)$$

$$\max H_4 = \text{Max}(0, \text{Max}(4*dVerX, \text{Max}(4*(2048+dVerY), 4*dVerX+4*(2048+dVerY)))) \quad (8\text{-}681)$$

$$\min H_4 = \text{Min}(0, \text{Min}(4*dVerX, \text{Min}(4*(2048+dVerY), 4*dVerX+4*(2048+dVerY)))) \quad (8\text{-}682)$$

$$bxWX_4 = ((\max W_4 - \min W_4) >> 11) + 9 \quad (8\text{-}683)$$

$$bxHX_4 = ((\max H_4 - \min H_4) >> 11) + 9 \quad (8\text{-}684)$$

$$bxWX_h = ((\text{Max}(0, 4*(2048+dHorX)) - \text{Min}(0, 4*(2048+dHorX))) >> 11) + 9 \quad (8\text{-}685)$$

$$bxHX_h = ((\text{Max}(0, 4*dVerX) - \text{Min}(0, 4*dVerX)) >> 11) + 9 \quad (8\text{-}686)$$

$$bxWX_v = ((\text{Max}(0, 4*dHorY) - \text{Min}(0, 4*dHorY)) >> 11) + 9 \quad (8\text{-}687)$$

$$bxHX_v = ((\text{Max}(0, 4*(2048+dVerY)) - \text{Min}(0, 4*(2048+dVerY))) >> 11) + 9 \quad (8\text{-}688)$$

If inter_pred_idc[xCb][yCb] is equal to PRED_BI and $bxWX_4*bxHX_4$ is less than or equal to 225, fallbackModeTriggered is set equal to 0.

Otherwise, if both $bxWX_h*bxHX_h$ is less than or equal to 165 and $bxWX_v*bxHX_v$ is less than or equal to 165, fallbackModeTriggered is set equal to 0.

For xSbIdx=0 . . . numSbX-1 and ySbIdx=0 . . . numSbY-1, the following applies:
The variables xPosCb and yPosCb are derived as follows:
If fallbackModeTriggered is equal to 1, the following applies:

$$xPosCb = (cbWidth >> 1) \quad (8\text{-}689)$$

$$yPosCb = (cbHeight >> 1) \quad (8\text{-}690)$$

Otherwise (fallbackModeTriggered is equal to 0), the following applies:

$$xPosCb = 2 + (xSbIdx << 2) \quad (8\text{-}691)$$

$$yPosCb = 2 + (ySbIdx << 2) \quad (8\text{-}692)$$

The luma motion vector mvLX[xSbIdx][ySbIdx] is derived as follows:

$$mvLX[xSbIdx][ySbIdx][0] = (mvScaleHor + dHorX*xPosCb + dHorY*yPosCb) \quad (8\text{-}693)$$

$$mvLX[xSbIdx][ySbIdx][1] = (mvScaleVer + dVerX*xPosCb + dVerY*yPosCb) \quad (8\text{-}694)$$

The rounding process for motion vectors as specified in clause 8.5.2.14 is invoked with mvX set equal to mvLX[xSbIdx][ySbIdx], rightShift set equal to 7, and leftShift set equal to 0 as inputs and the rounded mvLX[xSbIdx][ySbIdx] as output.

The motion vectors mvLX[xSbIdx][ySbIdx] are clipped as follows:

$$mvLX[xSbIdx][ySbIdx][0] = \text{Clip3}(-2^{17}, 2^{17}-1, mvLX[xSbIdx][ySbIdx][0]) \quad (8\text{-}695)$$

$$mvLX[xSbIdx][ySbIdx][1] = \text{Clip3}(-2^{17}, 2^{17}-1, mvLX[xSbIdx][ySbIdx][1]) \quad (8\text{-}696)$$

For xSbIdx=0 . . . numSbX-1 and ySbIdx=0 . . . numSbY-1, the following applies:
The average luma motion vector mvAvgLX is derived as follows:

$$mvAvgLX = mvLX[(xSbIdx>>1<<1)][(ySbIdx>>1<<1)] + mvLX[(xSbIdx>>1<<1)+1][(ySbIdx>>1<<1)+1] \quad (8\text{-}697)$$

$$mvAvgLX[0] = (mvAvgLX[0] + 1 - (mvAvgLX[0] >= 0)) >> 1 \quad (8\text{-}698)$$

$$mvAvgLX[1] = (mvAvgLX[1] + 1 - (mvAvgLX[1] >= 0)) >> 1 \quad (8\text{-}699)$$

The derivation process for chroma motion vectors in clause 8.5.2.13 is invoked with mvAvgLX and refIdxLX as inputs, and the chroma motion vector mvCLX[xSbIdx][ySbIdx] as output.

[Ed. (BB): This way four 2×2 chroma subblocks (4×4 chroma block) share the same motion vector which is derived from the average of two 4×4 luma subblock motion vectors. In the decoding process motion compensation is still performed on 2×2 chroma blocks which is however a motion compensation on a chroma 4×4 block because all chroma MVs inside a 4×4 chroma block are the same. I would prefer an editorial change that makes it more clear that affine chroma MC is performed on 4×4 chroma blocks.]

The variable cbProfFlagLX is derived as follows:
  If one or more of the following conditions are true, cbProfFlagLX is set equal to FALSE.
    affine_prof_enabled_flag is equal to 0.
    fallbackModeTriggered is equal to 1.
    numCpMv is equal to 2 and cpMvLX[1][0] is equal to cpMvLX[0][0] and cpMvLX[1][1] is equal to cpMvLX[0][1].
    numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].
    RefPicList[X][refIdxLX] is a long-term reference picture
  Otherwise, cbProfFlagLX set equal to TRUE.

. . .

5.10 Embodiment #10 on MMVD

If the selected MV basis (or base merge candidate) in MMVD mode is a bi-directional MV, MVD of prediction direction 0 is set equal to the signaled MVD directly and MVD of prediction direction 1 may be set equal to the signaled MVD or the opposite value of the signaled MVD.

If both reference pictures identified by the MV basis have larger or smaller POC than the current picture, MVD of prediction direction 1 may be set equal to the signaled MVD.

If one reference picture identified by the MV basis has larger POC than the current picture and the other reference picture identified by the MV basis has smaller POC than the current picture, MVD of prediction direction 1 may be set equal to the opposite value of the signaled MVD.

8.5.2.7 Derivation Process for Merge Motion Vector Difference

Inputs to this process are:
  a luma location (xCb, yCb) of the top-left sample of the current luma coding block relative to the top-left luma sample of the current picture,
  reference indices refIdxL0 and refIdxL1,
  prediction list utilization flags predFlagL0 and predFlagL1.

Outputs of this process are the luma merge motion vector differences in 1/16 fractional-sample accuracy mMvdL0 and mMvdL1.

The variable currPic specifies the current picture.

The luma merge motion vector differences mMvdL0 and mMvdL1 are derived as follows:
  If both predFlagL0 and predFlagL1 are equal to 1, the following applies:

currPocDiff$L$0=DiffPicOrderCnt(currPic,RefPicList[0][refIdx$L$0])    (8-349)

currPocDiff$L$1=DiffPicOrderCnt(currPic,RefPicList[1][refIdx$L$1])    (8-350)

[[If currPocDiffL0 is equal to currPocDiffL1, the following applies:

mMvd$L$0[0]=MmvdOffset[xCb][yCb][0]    (8-351)

mMvd$L$0[1]=MmvdOffset[xCb][yCb][1]    (8-352)

mMvd$L$1[0]=MmvdOffset[xCb][yCb][0]    (8-353)

mMvd$L$1[1]=MmvdOffset[xCb][yCb][1]    (8-354)

Otherwise, if Abs(currPocDiffL0) is greater than or equal to Abs(currPocDiffL1), the following applies:]]

mMvd$L$0[0]=MmvdOffset[xCb][yCb][0]    (8-355)

mMvd$L$0[1]=MmvdOffset[xCb][yCb][1]    (8-356)

[[If RefPicList[0][refIdxL0] is not a long-term reference picture and RefPicList[1][refIdxL1] is not a long-term reference picture, the following applies:

$td$=Clip3(−128,127,currPocDiff$L$0)    (8-357)

$tb$=Clip3(−128,127,currPocDiff$L$1)    (8-358)

$tx$=(16384+(Abs($td$)$td$)>>1))/$td$    (8-359)

distScaleFactor=Clip3(−4096,4095,($tb$*$tx$+32)>>6)    (8-360)

mMvd$L$1[0]=Clip3(−2$^{15}$,2$^{15}$−1, (distScaleFactor*mMvdL0[0]+128− (distScaleFactor*mMvdL0[0]>=0))>>8)    (8-361)

mMvd$L$1[1]=Clip3(−2$^{15}$,2$^{15}$−1, (distScaleFactor*mMvdL0[1]+128− (distScaleFactor*mMvdL0[1]>=0))>>8)    (8-362)

Otherwise, the following applies:]]

mMvd$L$1[0]=Sign(currPocDiffL0)==Sign(currPocDiffL1)?mMvdL0[0]:−mMvd$L$0[0]    (8-363)

mMvd$L$1[1]=Sign(currPocDiffL0)==Sign(currPocDiffL1)?mMvdL0[1]:−mMvd$L$0[1]    (8-364)

[[Otherwise (Abs(currPocDiffL0) is less than Abs(currPocDiffL1)), the following applies:

mMvd$L$1[0]=MmvdOffset[xCb][yCb][0]    (8-365)

mMvd$L$1[1]=MmvdOffset[xCb][yCb][1]    (8-366)

If RefPicList[0][refIdxL0] is not a long-term reference picture and RefPicList[1][refIdxL1] is not a long-term reference picture, the following applies:

$td$=Clip3(−128,127,currPocDiff$L$1)    (8-367)

$tb$=Clip3(−128,127,currPocDiff$L$0)    (8-368)

$tx$=(16384+(Abs($td$)$td$)>>1))/$td$    (8-369)

distScaleFactor=Clip3(−4096,4095,($tb$*$tx$+32)>>6)    (8-370)

mMvd$L$0[0]=Clip3(−2$^{15}$,2$^{15}$−1, (distScaleFactor*mMvdL1[0]+128− (distScaleFactor*mMvdL1[0]>=0))>>8)    (8-371)

mMvd$L$0[1]=Clip3(−2$^{15}$,2$^{15}$−1, (distScaleFactor*mMvdL1[1]+128− (distScaleFactor*mMvdL1[1]>=0))>>8))    (8-372)

Otherwise, the following applies:

mMvd$L$0[0]=Sign(currPocDiffL0)==Sign(currPocDiffL1)?mMvdL1[0:−mMvdL1[0]    (8-373)

mMvd$L$0[1]=Sign(currPocDiffL0)==Sign(currPocDiff$L$1)?mMvdL1[1]:−mMvdL1[1]    (8-374)]]

Otherwise (predFlagL0 or predFlagL1 are equal to 1), the following applies for X being 0 and 1:

mMvdLX[0]=(predFlagLX==1)?MmvdOffset[xCb][yCb][0]:0 (8-375)

mMvdLX[1]=(predFlagLX==1)?MmvdOffset[xCb][yCb][1]:0 (8-376)

5.11 Embodiment #11 on MMVD

If the selected MV basis (or base merge candidate) in MMVD mode is a bi-directional MV, MVD of prediction direction 1 is set equal to the signaled MVD directly and MVD of prediction direction 0 may be set equal to the signaled MVD or the opposite value of the signaled MVD.

If both reference pictures identified by the MV basis have larger or smaller POC than the current picture, MVD of prediction direction 0 may be set equal to the signaled MVD.

If one reference picture identified by the MV basis has larger POC than the current picture and the other reference picture identified by the MV basis has smaller POC than the current picture, MVD of prediction direction 0 may be set equal to the opposite value of the signaled MVD.

8.5.2.7 Derivation Process for Merge Motion Vector Difference

Inputs to this process are:
- a luma location (xCb, yCb) of the top-left sample of the current luma coding block relative to the top-left luma sample of the current picture,
- reference indices refIdxL0 and refIdxL1,
- prediction list utilization flags predFlagL0 and predFlagL1.

Outputs of this process are the luma merge motion vector differences in 1/16 fractional-sample accuracy mMvdL0 and mMvdL1.

The variable currPic specifies the current picture.

The luma merge motion vector differences mMvdL0 and mMvdL1 are derived as follows:

If both predFlagL0 and predFlagL1 are equal to 1, the following applies:

currPocDiffL0=DiffPicOrderCnt(currPic,RefPicList[0][refIdxL0]) (8-349)

currPocDiffL1=DiffPicOrderCnt(currPic,RefPicList[1][refIdxL1]) (8-350)

[[If currPocDiffL0 is equal to currPocDiffL1, the following applies:

mMvdL0[0]=MmvdOffset[xCb][yCb][0] (8-351)

mMvdL0[1]=MmvdOffset[xCb][yCb][1] (8-352)

mMvdL1[0]=MmvdOffset[xCb][yCb][0] (8-353)

mMvdL1[1]=MmvdOffset[xCb][yCb][1] (8-354)

Otherwise, if Abs(currPocDiffL0) is greater than or equal to Abs(currPocDiffL1), the following applies:

mMvdL0[0]=MmvdOffset[xCb][yCb][0] (8-355)

mMvdL0[1]=MmvdOffset[xCb][yCb][1] (8-356)

If RefPicList[0][refIdxL0] is not a long-term reference picture and RefPicList[1][refIdxL1] is not a long-term reference picture, the following applies:

td=Clip3(−128,127,currPocDiffL0) (8-357)

tb=Clip3(−128,127,currPocDiffL1) (8-358)

tx=(16384+(Abs(td)>>1))/td (8-359)

distScaleFactor=Clip3(−4096,4095,(tb*tx+32)>>6) (8-360)

mMvdL1[0]=Clip3(−$2^{15}$,$2^{15}$−1, (distScaleFactor*mMvdL0[0]+128−(distScaleFactor*mMvdL0[0]>=0))>>8) (8-361)

mMvdL1[1]=Clip3(−$2^{15}$,$2^{15}$−1, (distScaleFactor*mMvdL0[1]+128−(distScaleFactor*mMvdL0[1]>=0))>>8) (8-362)

Otherwise, the following applies:

mMvdL1[0]=Sign(currPocDiffL0)==Sign(currPocDiffL1)?mMvdL0[0]:−mMvdL0[0] (8-363)

mMvdL1[1]=Sign(currPocDiffL0)==Sign(currPocDiffL1)?mMvdL0[1]:−mMvdL0[1] (8-364)

Otherwise (Abs(currPocDiffL0) is less than Abs(currPocDiffL1)), the following applies:]]

mMvdL1[0]=MmvdOffset[xCb][yCb][0] (8-365)

mMvdL1[1]=MmvdOffset[xCb][yCb][1] (8-366)

[[If RefPicList[0][refIdxL0] is not a long-term reference picture and RefPicList[1][refIdxL1] is not a long-term reference picture, the following applies:

td=Clip3(−128,127,currPocDiffL1) (8-367)

tb=Clip3(−128,127,currPocDiffL0) (8-368)

tx=(16384+(Abs(td)td)>>1))/td (8-369)

distScaleFactor=Clip3(−4096,4095,(tb*tx+32)>>6) (8-370)

mMvdL0[0]=Clip3(−$2^{15}$,$2^{15}$−1, (distScaleFactor*mMvdL1[0]+128−(distScaleFactor*mMvdL1[0]>=0))>>8) (8-371)

mMvdL0[1]=Clip3(−$2^{15}$,$2^{15}$−1, (distScaleFactor*mMvdL1[1]+128−(distScaleFactor*mMvdL1[1]>=0))>>8)) (8-372)

Otherwise, the following applies:]]

mMvdL0[0]=Sign(currPocDiffL0)==Sign(currPocDiffL1)?mMvdL1[0]:−mMvdL1[0] (8-373)

mMvdL0[1]=Sign(currPocDiffL0)==Sign(currPocDiffL1)?mMvdL1[1]:−mMvdL1[1] (8-374)

Otherwise (predFlagL0 or predFlagL1 are equal to 1), the following applies for X being 0 and 1:

mMvdLX[0]=(predFlagLX==1)?MmvdOffset[xCb][yCb][0]:0 (8-375)

mMvdLX[1]=(predFlagLX==1)?MmvdOffset[xCb][yCb][1]:0 (8-376)

5.12 Embodiment #12 on MMVD

If the selected MV basis (or base merge candidate) in MMVD mode is a bi-directional MV, MVD of prediction direction 0 is set equal to the signaled MVD directly and MVD of prediction direction 1 may be set equal to the signaled MVD or the opposite value of the signaled MVD.

If both reference pictures are short-term reference pictures, MVD of prediction direction 1 may be derived by scaling the signaled MVD according to the POC distance between the two reference pictures and the current picture.

Otherwise,

If both reference pictures identified by the MV basis have larger or smaller POC than the current picture, MVD of prediction direction 1 may be set equal to the signaled MVD.

If one reference picture identified by the MV basis has larger POC than the current picture and the other reference picture identified by the MV basis has smaller POC than the current picture, MVD of prediction direction 1 may be set equal to the opposite value of the signaled MVD.

8.5.2.7 Derivation Process for Merge Motion Vector Difference

Inputs to this process are:
  a luma location (xCb, yCb) of the top-left sample of the current luma coding block relative to the top-left luma sample of the current picture,
  reference indices refIdxL0 and refIdxL1,
  prediction list utilization flags predFlagL0 and predFlagL1.

Outputs of this process are the luma merge motion vector differences in 1/16 fractional-sample accuracy mMvdL0 and mMvdL1.

The variable currPic specifies the current picture.

The luma merge motion vector differences mMvdL0 and mMvdL1 are derived as follows:

If both predFlagL0 and predFlagL1 are equal to 1, the following applies:

currPocDiffL0=DiffPicOrderCnt(currPic,RefPicList
  [0][refIdxL0])                                  (8-349)

currPocDiffL1=DiffPicOrderCnt(currPic,RefPicList
  [1][refIdxL1])                                  (8-350)

If currPocDiffL0 is equal to currPocDiffL1, the following applies:

mMvdL0[0]=MmvdOffset[xCb][yCb][0]                 (8-351)

mMvdL0[1]=MmvdOffset[xCb][yCb][1]                 (8-352)

mMvdL1[0]=MmvdOffset[xCb][yCb][0]                 (8-353)

mMvdL1[1]=MmvdOffset[xCb][yCb][1]                 (8-354)

Otherwise, [[if Abs(currPocDiffL0) is greater than or equal to Abs(currPocDiffL1),]] the following applies mMvdL0[0]=MmvdOffset[xCb][yCb][0]                 (8-355)

mMvdL0[1]=MmvdOffset[xCb][yCb][1]                 (8-356)

If RefPicList[0][refIdxL0] is not a long-term reference picture and RefPicList[1][refIdxL1] is not a long-term reference picture, the following applies:

$td$=Clip3(-128,127,currPocDiffL0)                (8-357)

$tb$=Clip3(-128,127,currPocDiffL1)                (8-358)

$tx$=(16384+(Abs($td$)>>1))/$td$                  (8-359)

distScaleFactor=Clip3(-4096,4095,($tb$*$tx$+32)>>6)   (8-360)

mMvdL1[0]=Clip3(|2$^{15}$,2$^{15}$-1,
  (distScaleFactor*mMvdL0[0]+128-
  (distScaleFactor*mMvdL0[0]>=0))>>8)             (8-361)

mMvdL1[1]=Clip3(-2$^{15}$,2$^{15}$-1,
  (distScaleFactor*mMvdL0[1]+128-
  (distScaleFactor*mMvdL0[1]>=0))>>8)             (8-362)

Otherwise, the following applies:

mMvdL1[0]=Sign(currPocDiffL0)==Sign(curr-
  PocDiffL1)?mMvdL0[0]:-mMvdL0[0]                 (8-363)

mMvdL1[1]=Sign(currPocDiffL0)==Sign(curr-
  PocDiffL1)?mMvdL0[1]:-mMvdL0[1]                 (8-364)

[[Otherwise (Abs(currPocDiffL0) is less than Abs(currPocDiffL1)), the following applies:

mMvdL1[0]=MmvdOffset[xCb][yCb][0]                 (8-365)

mMvdL1[1]=MmvdOffset[xCb][yCb][1]                 (8-366)

If RefPicList[0][refIdxL0] is not a long-term reference picture and RefPicList[1][refIdxL1] is not a long-term reference picture, the following applies:

$td$=Clip3(-128,127,currPocDiffL1)                (8-367)

$tb$=Clip3(-128,127,currPocDiffL0)                (8-368)

$tx$=(16384+(Abs($td$)$td$)>>1))/$td$             (8-369)

distScaleFactor=Clip3(-4096,4095,($tb$*$tx$+32)>>6)   (8-370)

mMvdL0[0]=Clip3(-2$^{15}$,2$^{15}$-1,
  (distScaleFactor*mMvdL1[0]+128-
  (distScaleFactor*mMvdL1[0]>=0))>>8)             (8-371)

mMvdL0[1]=Clip3(-2$^{15}$,2$^{15}$-1,
  (distScaleFactor*mMvdL1[1]+128-
  (distScaleFactor*mMvdL1[1]>=0))>>8))            (8-372)

Otherwise, the following applies:

mMvdL10[0]=Sign(currPocDiffL0)==Sign(curr-
  PocDiffL1)?mMvdL1[0]:-mMvdL1[0]                 (8-373)

mMvdL0[1]=Sign(currPocDiffL0)==Sign(curr-
  PocDiffL1)?mMvdL1[1:-mMvdL1[1]                  (8-374)]]

Otherwise (predFlagL0 or predFlagL1 are equal to 1), the following applies for X being 0 and 1:

mMvdLX[0]=(predFlagLX==1)?MmvdOffset[xCb]
  [yCb][0]:0                                      (8-375)

mMvdLX[1]=(predFlagLX==1)?MmvdOffset[xCb]
  [yCb][1]:0                                      (8-376)

5.13 Embodiment #13 on MMVD

If the selected MV basis (or base merge candidate) in MMVD mode is a bi-directional MV, MVD of prediction direction 1 is set equal to the signaled MVD directly and MVD of prediction direction 0 may be set equal to the signaled MVD or the opposite value of the signaled MVD.

If both reference pictures are short-term reference pictures, MVD of prediction direction 0 may be derived by scaling the signaled MVD according to the POC distance between the two reference pictures and the current picture.

Otherwise,

If both reference pictures identified by the MV basis have larger or smaller POC than the current picture, MVD of prediction direction 0 may be set equal to the signaled MVD.

If one reference picture identified by the MV basis has larger POC than the current picture and the other reference picture identified by the MV basis has smaller POC than the current picture, MVD of prediction direction 0 may be set equal to the opposite value of the signaled MVD.

8.5.2.7 Derivation Process for Merge Motion Vector Difference

Inputs to this process are:
  a luma location (xCb, yCb) of the top-left sample of the current luma coding block relative to the top-left luma sample of the current picture,
  reference indices refIdxL0 and refIdxL1,
  prediction list utilization flags predFlagL0 and predFlagL1.

Outputs of this process are the luma merge motion vector differences in 1/16 fractional-sample accuracy mMvdL0 and mMvdL1.

The variable currPic specifies the current picture.

The luma merge motion vector differences mMvdL0 and mMvdL1 are derived as follows:

If both predFlagL0 and predFlagL1 are equal to 1, the following applies:

currPocDiffL0=DiffPicOrderCnt(currPic,RefPicList [0][refIdxL0]) (8-349)

currPocDiffL1=DiffPicOrderCnt(currPic,RefPicList [1][refIdxL1]) (8-350)

If currPocDiffL0 is equal to currPocDiffL1, the following applies:

mMvdL0[0]=MmvdOffset[xCb][yCb][0] (8-351)

mMvdL0[1]=MmvdOffset[xCb][yCb][1] (8-352)

mMvdL1[0]=MmvdOffset[xCb][yCb][0] (8-353)

mMvdL1[1]=MmvdOffset[xCb][yCb][1] (8-354)

[[Otherwise, if Abs(currPocDiffL0) is greater than or equal to Abs(currPocDiffL1), the following applies:

mMvdL0[0]=MmvdOffset[xCb][yCb][0] (8-355)

mMvdL0[1]=MmvdOffset[xCb][yCb][1] (8-356)

If RefPicList[0][refIdxL0] is not a long-term reference picture and RefPicList[1][refIdxL1] is not a long-term reference picture, the following applies:

$td$=Clip3(-128,127,currPocDiffL0) (8-357)

$tb$=Clip3(-128,127,currPocDiffL1) (8-358)

$tx$=(16384+(Abs($td$)>>1))/$td$ (8-359)

distScaleFactor=Clip3(-4096,4095,($tb$*$tx$+32)>>6) (8-360)

mMvdL1[0]=Clip3($-2^{15},2^{15}-1$, (distScaleFactor*mMvdL0[0]+128− (distScaleFactor*mMvdL0[0]>=0))>>8) (8-361)

mMvdL1[1]=Clip3($-2^{15},2^{15}-1$, (distScaleFactor*mMvdL0[1]+128− (distScaleFactor*mMvdL0[1]>=0))>>8) (8-362)

Otherwise, the following applies:

mMvdL1[0]=Sign(currPocDiffL0)==Sign(curr-PocDiffL1)?mMvdL0[0]:−mMvdL0[0] (8-363)

mMvdL1[1]=Sign(currPocDiffL0)==Sign(curr-PocDiffL1)?mMvdL0[1]:−mMvdL0[1] (8-364)

Otherwise (Abs(currPocDiffL0) is less than Abs(currPocDiffL1))]], the following applies:

mMvdL1[0]=MmvdOffset[xCb][yCb][0] (8-365)

mMvdL1[1]=MmvdOffset[xCb][yCb][1] (8-366)

If RefPicList[0][refIdxL0] is not a long-term reference picture and RefPicList[1][refIdxL1] is not a long-term reference picture, the following applies:

$td$=Clip3(-128,127,currPocDiffL1) (8-367)

$tb$=Clip3(-128,127,currPocDiffL0) (8-368)

$tx$=(16384+(Abs($td$)$td$)>>1))/$td$ (8-369)

distScaleFactor=Clip3(-4096,4095,($tb$*$tx$+32)>>6) (8-370)

mMvdL0[0]=Clip3($-2^{15},2^{15}-1$, (distScaleFactor*mMvdL1[0]+128− (distScaleFactor*mMvdL1[0]>=0))>>8) (8-371)

mMvdL0[1]=Clip3($-2^{15},2^{15}-1$, (distScaleFactor*mMvdL1[1]+128− (distScaleFactor*mMvdL1[1]>=0))>>8)) (8-372)

Otherwise, the following applies:

mMvdL10[0]=Sign(currPocDiffL0)==Sign(curr-PocDiffL1)?mMvdL1[0]:−mMvdL1[0] (8-373)

mMvdL0[1]=Sign(currPocDiffL0)==Sign(curr-PocDiffL1)?mMvdL1[1]:−mMvdL1[1] (8-374)

Otherwise (predFlagL0 or predFlagL1 are equal to 1), the following applies for X being 0 and 1:

mMvdLX[0]=(predFlagLX==1)?MmvdOffset[xCb][yCb][0]:0 (8-375)

mMvdLX[1]=(predFlagLX==1)?MmvdOffset[xCb][yCb][1]:0 (8-376)

Figure 13A:
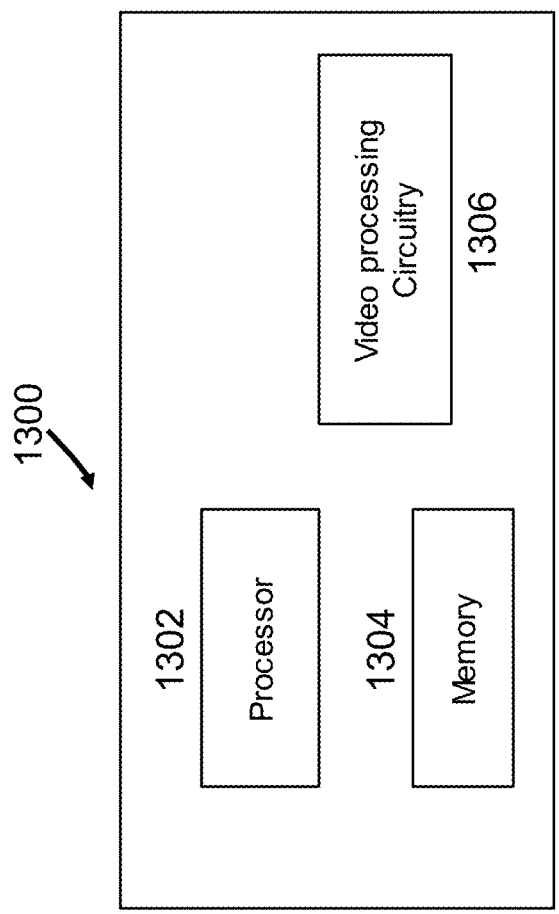
FIGS. 13A and 13B are block diagrams of examples of a hardware platform used for implementing techniques described in the present document.

FIG. 13A is a block diagram of a video processing apparatus 1300. The apparatus 1300 may be used to implement one or more of the methods described herein. The apparatus 1300 may be embodied in a smartphone, tablet, computer, Internet of Things (IoT) receiver, and so on. The apparatus 1300 may include one or more processors 1302, one or more memories 1304 and video processing hardware 1306. The processor(s) 1302 may be configured to implement one or more methods described in the present document. The memory (memories) 1304 may be used for storing data and code used for implementing the methods and techniques described herein. The video processing hardware 1306 may be used to implement, in hardware circuitry, some techniques described in the present document. In some embodiments, the video processing hardware 1306 may be at least partly internal to the processor(s) 1302 (e.g., a graphics co-processor).

Figure 13B:
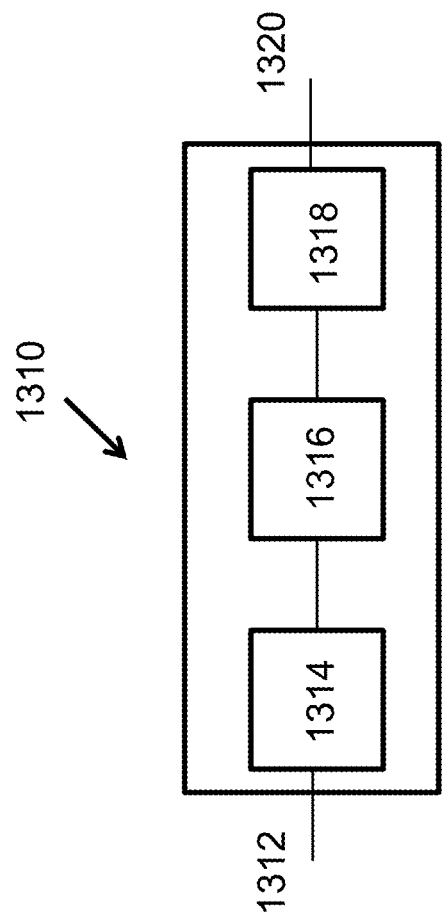

FIG. 13B is another example of a block diagram of a video processing system in which disclosed techniques may be implemented. FIG. 13B is a block diagram showing an example video processing system 1310 in which various techniques disclosed herein may be implemented. Various implementations may include some or all of the components of the system 1310. The system 1310 may include input 1312 for receiving video content. The video content may be received in a raw or uncompressed format, e.g., 8 or 10 bit multi-component pixel values, or may be in a compressed or encoded format. The input 1312 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1310 may include a coding component 1314 that may implement the various coding or encoding methods described in the present document. The coding component 1314 may reduce the average bitrate of video from the input 1312 to the output of the coding component 1314 to produce a coded representation of the video. The coding techniques are therefore sometimes called video compression or video transcoding techniques. The output of the coding component 1314 may be either stored, or transmitted via a communication connected, as represented by the component 1316. The stored or communicated bitstream (or coded) representation of the video received at the input 1312 may be used by the component 1318 for generating pixel values or displayable video that is sent to a display interface 1320. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 13A or 13B.

Figure 14:
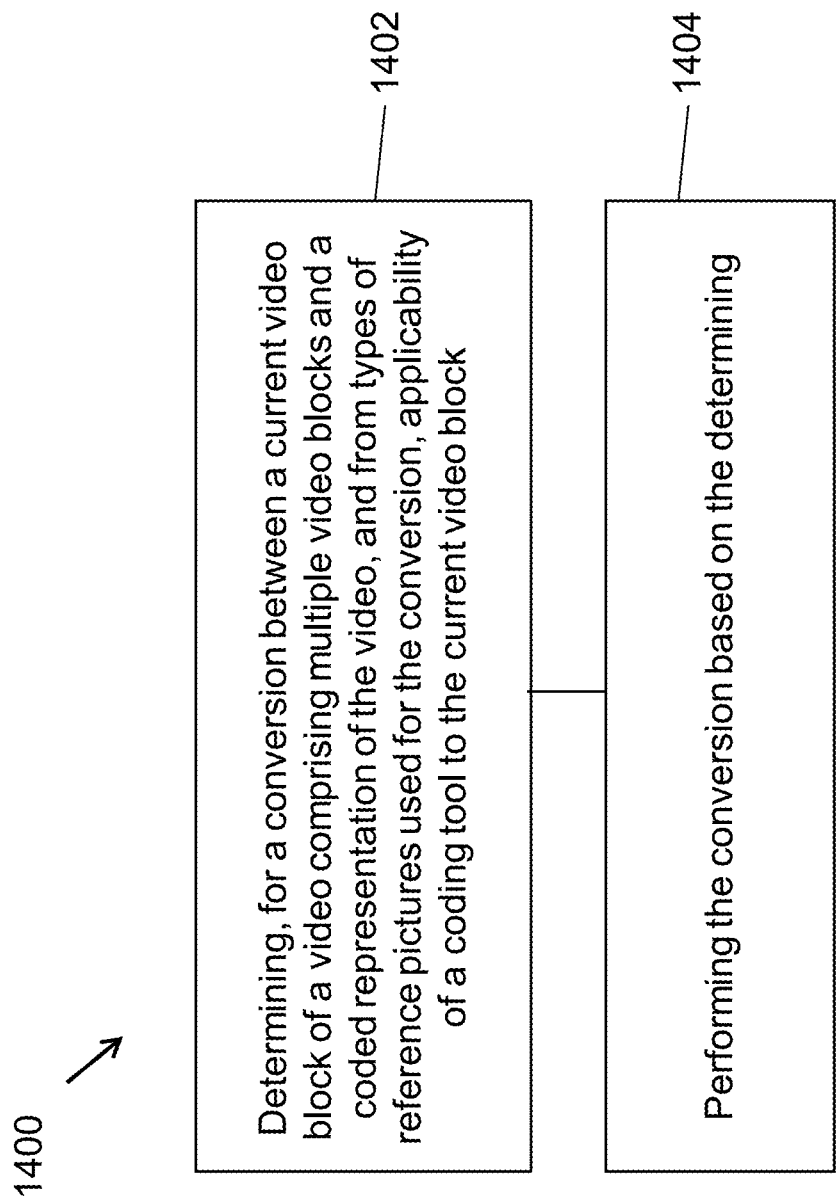
FIG. 14 is a flowchart for an example method of video processing based on some implementations of the disclosed technology.

FIG. 14 is a flowchart for a method 1400 of processing a video. The method 1400 includes determining (1402), for a conversion between a current video block of a video comprising multiple video blocks and a coded representation of the video, and from types of reference pictures used for the conversion, applicability of a coding tool to the current video block and performing (1404) the conversion based on the determining.

Figure 15A:
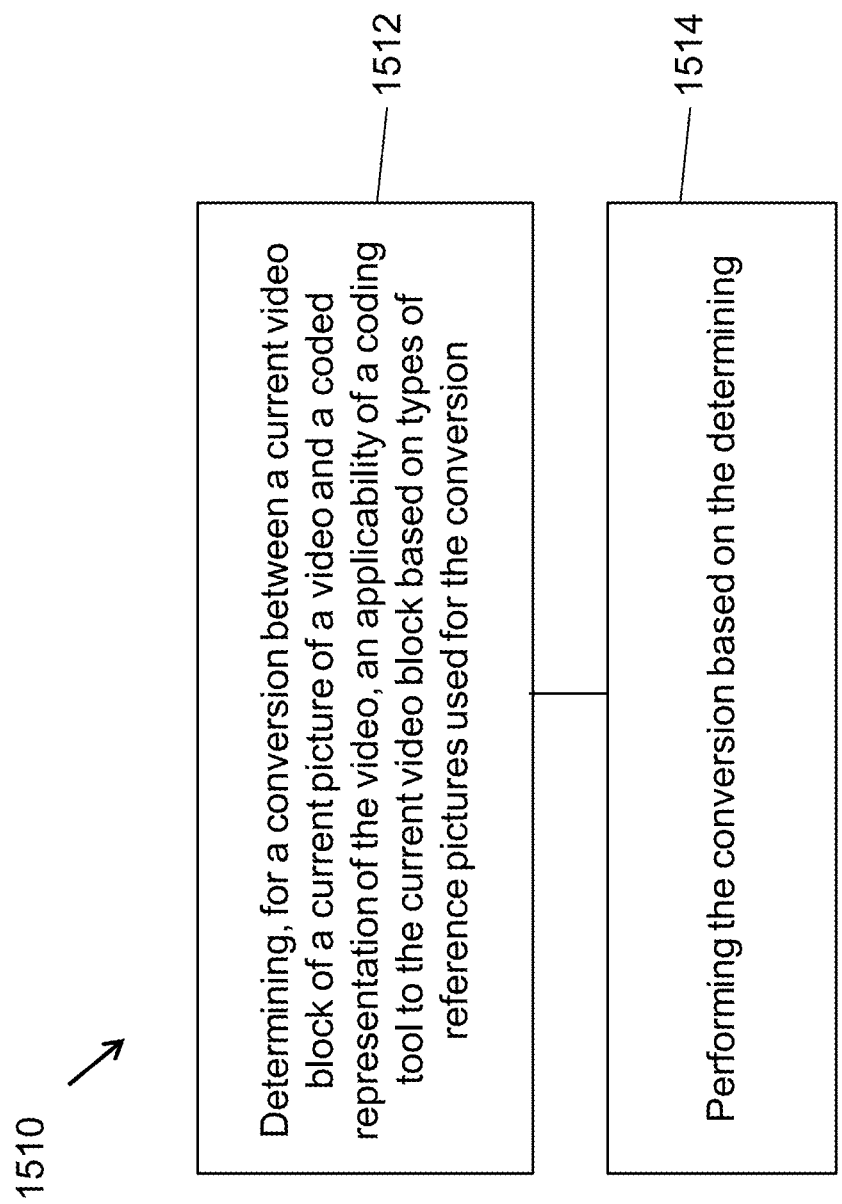
FIGS. 15A to 15C show flowcharts for example methods of video processing based on some implementations of the disclosed technology.

FIG. 15A is a flowchart for a method 1510 of processing a video. The method 1510 includes, at step 1512, determining, for a conversion between a current video block of a current picture of a video and a coded representation of the video, an applicability of a coding tool to the current video block based on types of reference pictures used for the conversion. The method 1510 includes, at step 1514, performing the conversion based on the determining. In some implementations, the types of the reference pictures are at least based on 1) whether the reference pictures are short term reference pictures or long term reference pictures, 2) resolutions of the reference pictures or the current picture, or 3) picture order count (POC) distances of the reference pictures relative to the current picture.

Figure 15B:
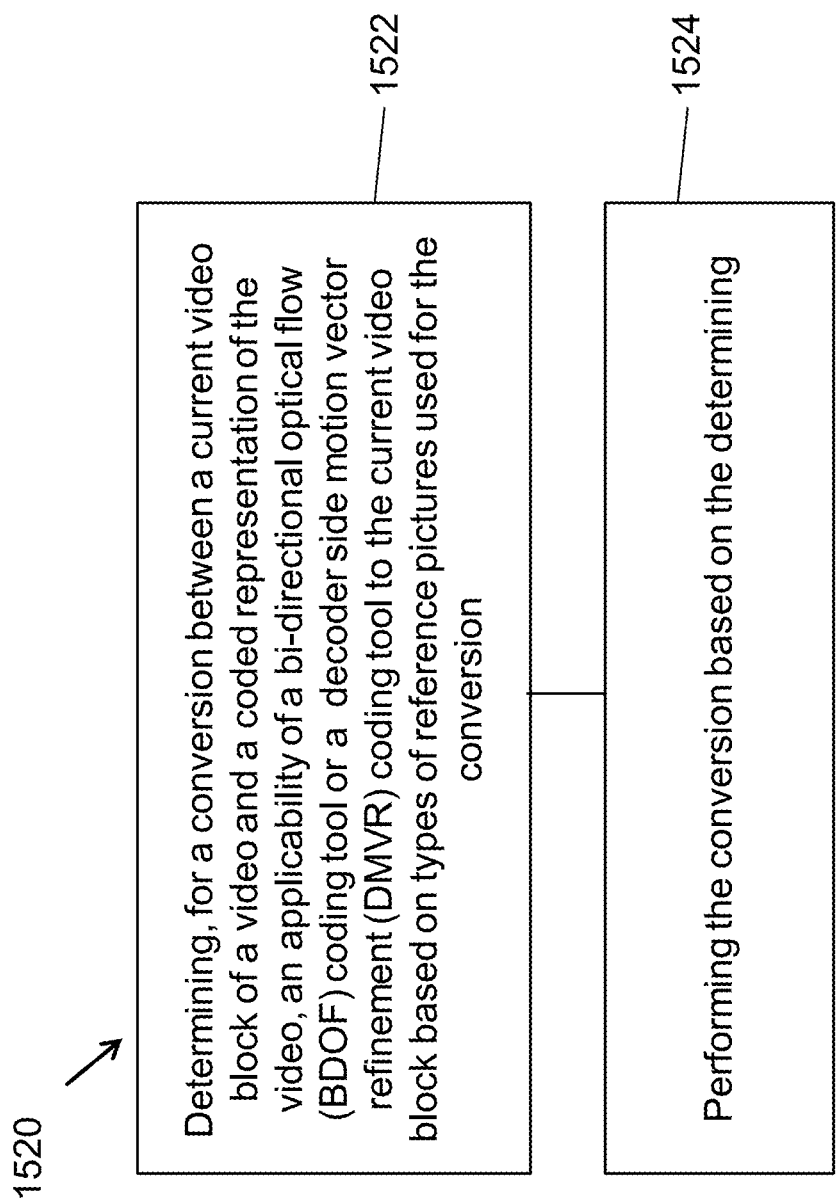

FIG. 15B is a flowchart for a method 1520 of processing a video. The method 1520 includes, at step 1522, determining, for a conversion between a current video block of a video and a coded representation of the video, an applicability of a bi-directional optical flow (BDOF) coding tool or a decoder side motion vector refinement (DMVR) coding tool to the current video block based on types of reference pictures used for the conversion. The method 1520 includes, at step 1524, performing the conversion based on the determining. In some implementations, using the BDOF coding tool, one or more initial predictions are refined based on an optical flow calculation. In some implementations, using the DMVR coding tool, motion information of the current video block is refined using prediction blocks of the current video block. In some implementations, the types of reference pictures are at least based on 1) whether the reference pictures are short term reference pictures or long term reference pictures, 2) resolutions of the reference pictures or the current picture, or 3) picture order count (POC) distances of the reference pictures relative to the current picture.

Figure 15C:
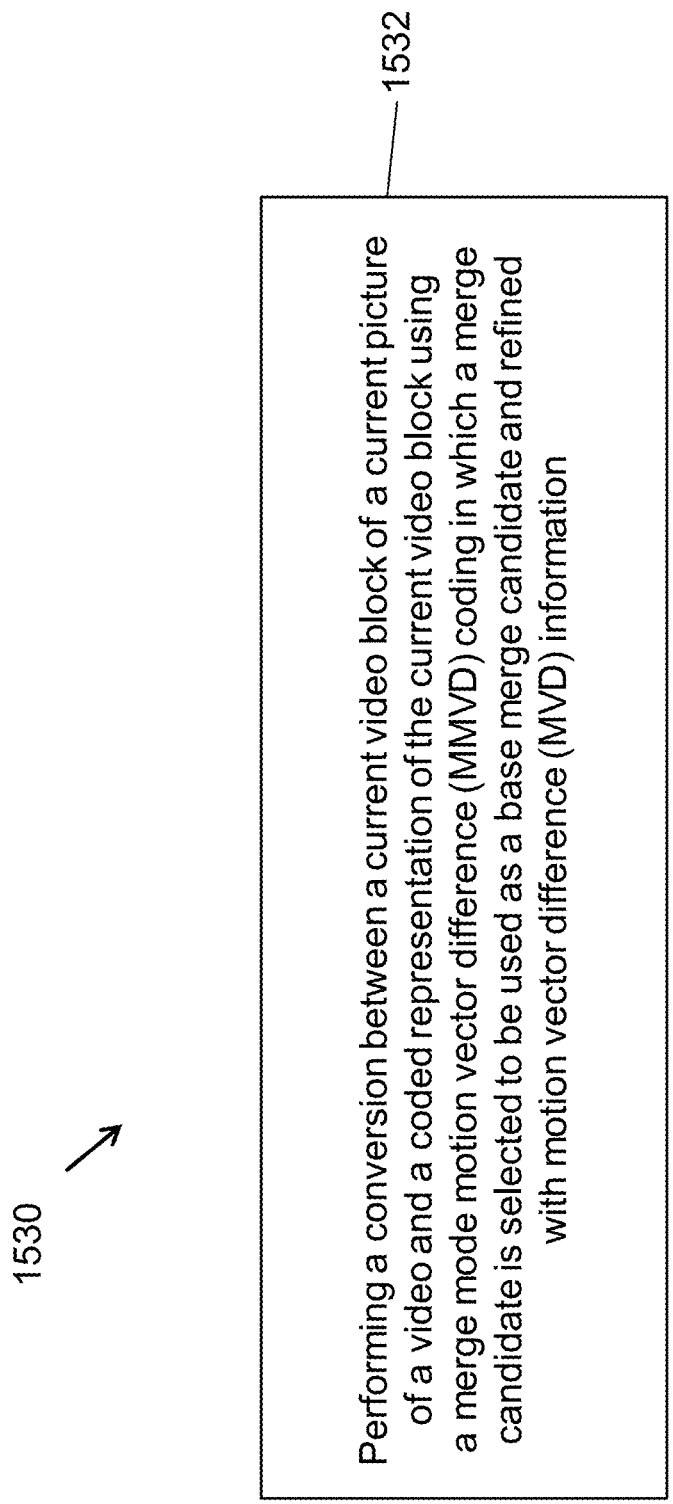

FIG. 15C is a flowchart for a method 1530 of processing a video. The method 1530 includes, at step 1532, performing a conversion between a current video block of a current picture of a video and a coded representation of the current video block using a merge mode motion vector difference (MMVD) coding in which a merge candidate is selected to be used as a base merge candidate and refined with motion vector difference (MVD) information. In some implementations, during the MMVD coding, the merge candidate is selected to be used as the base merge candidate and refined with motion vector difference (MVD) information without scaling the MVD information. In some implementations, the base merge candidate is a bi-directional motion vector, and wherein a MVD of one prediction direction is set as equal to a MVD included in the coded representation and another MVD of the other prediction direction is set as equal or opposite to the MVD included in the coded representation based on a coding condition of the video In some implementations, the coded representation conforms to a rule that specifies that at most a first MVD value for a first prediction direction is included in the coded representation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

Various solutions and embodiments described in the present document are further described using a list of clauses. The first set of clauses describe certain features and aspects of the disclosed techniques in the previous section.

In addition to, the embodiments described in items 1, 4 and 5 in the previous section:

1. A method for processing video, comprising: determining, for a conversion between a current video block of a video comprising multiple video blocks and a coded representation of the video, and from types of reference pictures used for the conversion, applicability of a coding tool to the current video block; and performing the conversion based on the determining.

2. The method of clause 1, wherein the type of the reference picture is one of a long-term reference picture type or a short-term reference picture type.

3. The method of any of clauses 1-2, wherein the property of the reference picture includes a resolution of the reference picture.

4. The method of any of clause 1-3, wherein the determining includes determining that a specific coding tool is disabled for use with the current video block due to the reference pictures being of different types.

5. The method of any of clause 1-3, wherein the determining includes determining that a specific coding tool is enabled for use with the current video block due to the reference pictures being of a same type.

6. The method of any of clause 1-3, wherein the determining includes determining that a specific coding tool is enabled for use with the current video block due to all the reference pictures being of a give type.

7. The method of any of clause 1-3, wherein the determining includes determining that a specific coding tool is disabled for use with the current video block due to all the reference pictures being of a given type.

8. The method of any of clause 1-3, wherein a specific coding tool is applied for use with a specific reference picture due to the property of the specific reference picture being a certain type.

9. The method of any of clause 1-3, wherein a specific coding tool is disabled for use with a specific reference picture due to the property of the specific reference picture being a certain type.

10. The method of any of clauses 1 to 9, wherein the coding tool corresponds to a bidirectional optical flow coding tool.

11. The method of any of clauses 1 to 9, wherein the coding tool corresponds to one or merge mode with motion vector difference (MMVD) tool or bi-predictive with coding unit weights (BCW) or prediction refinement with optical flow (PROF) or triangular partition mode (TPM) or spatial motion vector difference (SMVD) or Affine coding tool.

12. The method of any of clauses 1 to 11, wherein types of reference pictures are dependent on a picture order count difference from a current picture of the current video block.

13. The method of any of clauses 1 to 12, wherein types of reference pictures depend on a temporal layer of the reference pictures.

In addition to, the embodiments described in item 2 in the previous section:

14. A method for processing video, comprising: determining, for a conversion between a current video block of a video comprising multiple video blocks and a coded representation of the video, and from types of reference pictures used for the conversion, applicability of bi-directional optical flow (BDOF) coding tool to the current video block; and performing the conversion based on the determining.

15. The method of clause 14, wherein the type of the reference picture is one of a long-term reference picture type or a short-term reference picture type.

16. The method of any of clauses 14-15, wherein the property of the reference picture includes a resolution of the reference picture.

17. The method of any of clause 14-16, wherein the determining includes determining that the BDOF coding tool is disabled for use with the current video block due to the reference pictures being of different types.

18. The method of any of clause 14-16, wherein the determining includes determining that the BDOF coding tool is enabled for use with the current video block due to the reference pictures being of a same type.

19. The method of any of clause 14-16 the current video block due to all the reference pictures being of a give type.

20. The method of any of clause 14-16, wherein the determining includes determining that the BDOF coding tool is disabled for use with the current video block due to all the reference pictures being of a given type.

21. The method of any of clause 14-16, wherein the BDOF coding tool is applied for use with a specific reference picture due to the property of the specific reference picture being a certain type.

22. The method of any of clause 14-16, wherein the BDOF coding tool is disabled for use with a specific reference picture due to the property of the specific reference picture being a certain type.

In addition to, the embodiments described in item 3 in the previous section:

23. A method for processing video, comprising: determining, for a conversion between a current video block of a video comprising multiple video blocks and a coded representation of the video, and from types of reference pictures used for the conversion, applicability of a coding tool to the current video block, wherein the coding tool corresponds to a decoder side motion vector refinement (DMVR) tool; and performing the conversion based on the determining.

24. The method of clause 23, wherein the type of the reference picture is one of a long-term reference picture type or a short-term reference picture type.

25. The method of any of clauses 23-24, wherein the property of the reference picture includes a resolution of the reference picture.

26. The method of any of clause 23-25, wherein the determining includes determining that the DMVR coding tool is disabled for use with the current video block due to the reference pictures being of different types.

27. The method of any of clause 23-25, wherein the determining includes determining that the DMVR coding tool is enabled for use with the current video block due to the reference pictures being of a same type.

28. The method of any of clause 23-25, wherein the determining includes determining that the DMVR coding tool is enabled for use with the current video block due to all the reference pictures being of a given type.

29. The method of any of clause 23-25, wherein the determining includes determining that the DMVR coding tool is disabled for use with the current video block due to all the reference pictures being of a given type.

In addition to, the embodiments described in item 6 in the previous section:

30. A method of video processing, comprising: performing a conversion between a current video block of a video and a coded representation of the current video block using a merge mode motion vector difference (MMVD) coding in which the conversion uses a combination of motion vector differencing and merge mode candidates; wherein at least one of a scaling or a prediction direction of a component of MVD is determined from a coding condition of the video.

31. The method of clause 30, wherein the coding condition comprises a comparison between picture order count of a current picture of the current video block and a reference picture with a threshold.

32. The method of clause 30, wherein the scaling is a unity scaling.

In addition to, the embodiments described in item 7 in the previous section:

33. A method of video processing, comprising: performing a conversion between a current video block of a video and a coded representation of the current video block using a merge mode motion vector difference (MMVD) coding in which a single MVD value of a single direction is signaled.

34. The method of clause 33, further comprising deriving a second MVD value of another direction from the first MVD value based on a rule.

35. The method of clause 33, wherein the single direction corresponds to a prediction direction of a basis motion vector used for the signaling.

36. The method of clause 34, wherein the deriving includes deriving the second MVD based on a type of reference picture for which the second MVD is derived.

Further preferred solutions adopted by some embodiments include:

37. The method of any of clauses 1 to 36, wherein the conversion comprises encoding the current video block into the coded representation or decoding the coded representation to generate the current video block.

38. A video decoding apparatus comprising a processor configured to implement a method recited in one or more of clauses 1 to 37.

39. A video encoding apparatus comprising a processor configured to implement a method recited in one or more of clauses 1 to 37.

40. A computer program product having computer code stored thereon, the code, when executed by a processor, causes the processor to implement a method recited in any of clauses 1 to 37.

41. A method, apparatus or system described in the present document.

The second set of clauses describe certain features and aspects of the disclosed techniques in the previous section, for example, Example Implementations 1 to 7.

1. A method for processing video, comprising: determining, for a conversion between a current video block of a current picture of a video and a coded representation of the video, an applicability of a coding tool to the current video block based on types of reference pictures used for the conversion; and performing the conversion based on the determining, wherein the types of the reference pictures are at least based on 1) whether the reference pictures are short term reference pictures or long term reference pictures, 2) resolutions of the reference pictures or the current picture, or 3) picture order count (POC) distances of the reference pictures relative to the current picture.

2. The method of claim 1, wherein the determining includes determining that the coding tool is disabled for use with the current video block due to at least two of the reference pictures being of different types.

3. The method of claim 1, wherein the determining includes determining that the coding tool is disabled for use with the current video block due to one or all of the reference pictures being of a given type.

4. The method of claim 3, wherein the given type indicates that a reference picture is a long term reference picture.

5. The method of claim 3, wherein each of the one or all of the reference pictures being of the given type corresponds to an adaptive resolution picture (ARP) such that each of the one or all of the reference pictures has a resolution different from a resolution of the current picture.

6. The method of claim 1, wherein the coding tool is only applied for use with one or more reference pictures with a given type.

7. The method of claim 1, wherein the coding tool is not applied for use with one or more reference pictures not being of a given type.

8. The method of claim 6 or 7, wherein the given type indicates that a reference picture is a short term reference picture.

9. The method of claim 6 or 7, wherein the one or more reference pictures with the given type does not correspond to an adaptive resolution picture (ARP) and wherein the one or more reference pictures with the given type have a resolution same as a resolution of the current picture.

10. The method of claim 6 or 7, wherein the one or more reference pictures with the given type have same picture order count (POC) distances relative to the current picture.

11. The method of claim 1, wherein the determining includes omitting checking of picture order count (POC) distances of each of the reference pictures relative to the current picture due to all of the reference pictures being long term reference pictures.

12. The method of claim 1, wherein the determining includes making a determination regarding an enablement of the coding tool for use with the current video block due to at least two of the reference pictures being of a same type.

13. The method of claim 12, wherein each of the at least two of the reference picture being of the same type has same picture order count (POC) distances relative to the current picture.

14. The method of claim 1, wherein the determining includes making a determination regarding an enablement of the coding tool for use with the current video block due to some or all the reference pictures being of a given type.

15. The method of any of claim 1, wherein the determining includes determining that the coding tool is disabled for use with the current video block due to none of the reference pictures being of a given type.

16. The method of claim 14, wherein the determining includes determining that the coding tool is disabled for use with the current video block due to some of the reference pictures being of another given type.

17. The method of any of claims 1 to 16, wherein the coding tool corresponds to a bidirectional optical flow coding tool (BDOF) in which one or more initial predictions are refined based on an optical flow calculation.

18. The method of any of claims 1 to 16, wherein the coding tool corresponds to a decoder-side motion vector refinement (DMVR) in which motion information of the current video block is refined by using prediction blocks.

19. The method of any of claims 1 to 16, wherein the coding tool corresponds to a refinement with optical flow (PROF) in which one or more initial predictions are refined based on an optical flow calculation.

20. The method of claim 19, wherein the coded representation includes a prediction refinement utilization flag (cbProfFlagLX) that is set as false in a case that RprConstraintsActive[X][refIdxLX] is equal to 1, X being 0 or 1.

21. The method of any of claims 1 to 16, wherein the coding tool corresponds to a merge mode with motion vector difference (MMVD) tool, an affine coding tool, a combined inter-intra prediction (CIIP) tool, an adaptive motion vector resolution (AMVR) tool, a triangular partition mode (TPM) tool, a spatial motion vector difference (SMVD), a switchable interpolation filtering tool, a BCW (bi-prediction with CU-level weights) tool, or a decoder side motion vector derivation (DMVD) tool.

22. The method of any of claims 1 to 16, wherein the coding tool corresponds to a coding tool that refines motion information or prediction signals of the current video block based on coded information of the current video block.

23. The method of any of claims 17 to 22, wherein the determining includes determining that the coding tool is disabled for use with the current video block due to two of the reference pictures being of different types from each other.

24. The method of any of claims 17 to 22, wherein the determining includes making a determination regarding an enablement of the coding tool for use with the current video block due to all of the reference pictures being of a given type.

25. The method of claim 23 or 24, wherein such restriction may be applied to bi-directional and/or uni-directional prediction blocks.

26. The method of claim 17 or 18, wherein an indication whether the coding tool is applied or not is not signaled in a case that the coding tool is disabled.

27. The method of claim 17 or 18, wherein an indication whether the coding tool is applied or not is signaled as false in a case that the coding tool is disabled.

28. The method of any of claims 1 to 27, wherein a type of a reference picture is further dependent on a temporal layer of a reference picture.

29. The method of claims 1 to 27, wherein a type of a reference picture is further dependent on whether a certain coding tool is applied to the reference picture or not.

30. A method for processing video, comprising: determining, for a conversion between a current video block of a video and a coded representation of the video, an applicability of a bi-directional optical flow (BDOF) coding tool or a decoder side motion vector refinement (DMVR) coding tool to the current video block based on types of reference pictures used for the conversion; and performing the conversion based on the determining, wherein, using the BDOF coding tool, one or more initial predictions are refined based on an optical flow calculation, and wherein, using the DMVR coding tool, motion information of the current video block is refined using prediction blocks of the current video block, and wherein the types of reference pictures are at least based on 1) whether the reference pictures are short term reference pictures or long term reference pictures, 2) resolutions of the reference pictures or the current picture, or 3) picture order count (POC) distances of the reference pictures relative to the current picture.

31. The method of claim 30, wherein the determining includes making a determination regarding an enablement of the coding tool for use with the current video block due to all of the reference pictures being of a given type.

32. The method of claim 30, wherein the determining includes determining that the coding tool is disabled for use with the current video block due to at least one of the reference pictures not being of a given type.

33. The method of claim 31 or 32, wherein the given type indicates that a reference picture is a short term reference picture.

34. The method of claim 31 or 32, wherein a reference picture being of the given type does not correspond to an adaptive resolution picture (ARP) and has a resolution same as a resolution of a current picture including the current video block.

35. The method of claim 31 or 32, wherein the reference pictures being of the given type have same picture order count (POC) distances relative to a current picture including the current video block.

36. The method of claim 30, wherein the determining includes determining that the coding tool is disabled for use with the current video block due to two of the reference pictures being of different types from each other.

37. The method of claim 30, wherein all the reference pictures have a given type and the determining includes omitting checking of picture order count (POC) distances of each of the reference pictures relative to the current picture.

38. The method of claim 37, wherein the given type indicates that a reference picture is a long term reference picture.

39. The method of any of claims 30 to 38, wherein a type of a reference picture is further dependent on a temporal layer of a reference picture.

40. The method of any of claims 30 to 38, wherein a type of a reference picture is further dependent on whether a certain codding tool is applied to the reference picture or not.

41. A method of video processing, comprising: performing a conversion between a current video block of a current picture of a video and a coded representation of the current video block using a merge mode motion vector difference (MMVD) coding in which a merge candidate is selected to be used as a base merge candidate and refined with motion vector difference (MVD) information, without scaling the MVD information; and wherein the base merge candidate is a bi-directional motion vector, and wherein a MVD of one prediction direction is set as equal to a MVD included in the coded representation and another MVD of the other prediction direction is set as equal or opposite to the MVD included in the coded representation based on a coding condition of the video.

42. The method of claim 41, wherein the coding condition comprises a comparison between picture order count (POC) of reference pictures identified by the base merge candidate and POC of the current picture.

43. The method of claim 42, wherein both of the reference pictures have larger or smaller POC than that of the current picture, the motion vector difference of the other prediction direction is set equal to the MVD included in the coded representation.

44. The method of claim 42, wherein one of the reference pictures has larger POC than that of the current picture and the other of the reference pictures has smaller POC than that of the current picture, the motion vector difference of the other prediction direction is set to be opposite to the MVD included in the coded representation.

45. A method of video processing, comprising: performing a conversion between a current video block of a current picture of a video and a coded representation of the current video block using a merge mode motion vector difference (MMVD) coding in which a merge candidate is selected to be used as a base merge candidate and refined with motion vector difference (MVD) information, wherein the coded representation conforms to a rule that specifies that at most a first MVD value for a first prediction direction is included in the coded representation.

46. The method of claim 45, wherein the base merge candidate is a bi-directional motion vector and a second MVD value for a second prediction direction is derived from the first MVD value.

47. The method of claim 45, wherein the base merge candidate is a uni-directional motion vector and the first prediction direction is set equal to a prediction direction of the base merge candidate.

48. The method of claim 45, wherein the base merge candidate is a bi-directional motion vector and the first prediction direction is set with an index that is equal to 0 or 1.

49. The method of claim 46, wherein the second MVD is derived based on types of reference pictures that are identified by the base merge candidate.

50. The method of claim 49, wherein the types of the reference pictures comprise a first type corresponding to a long-term reference picture or a second type corresponding to a short term reference picture.

51. The method of claim 50, wherein both reference pictures are the second type and wherein the second MVD value is derived by scaling the first MVD based on POC distances between the reference pictures and the current picture.

52. The method of claim 49, wherein both reference pictures are larger or smaller POC distances than POC distances of the current picture, the second MVD is set equal to the first MVD.

53. The method of claim 52, wherein at least one of the reference pictures are not the second type.

54. The method of claim 49, wherein one of the reference pictures has larger POC distances than POC distances of the current picture and the other of the reference pictures has smaller POC distances than the POC distances of the current picture, the second MVD is set as opposite to the first MVD.

55. The method of claim 54, wherein at least one of the reference pictures are not the second type.

56. The method of any of claims 1 to 55, wherein the conversion comprises encoding the current video block into the coded representation or decoding the coded representation to generate the current video block.

57. An apparatus in a video system comprising a processor and a non-transitory memory with instructions thereon, wherein the instructions upon execution by the processor, cause the processor to implement the method in any one of claims 1 to 56.

58. A computer program product stored on a non-transitory computer readable media, the computer program product including program code for carrying out the method in any one of claims 1 to 56.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
determining, for a first conversion between a first video block of a first picture of a video and a bitstream of the video, an applicability of a first coding tool to the first video block based on types of first reference pictures used for the first conversion, wherein the first coding tool is used to refine a motion vector based on at least one gradient value corresponding to a sample in a reference block of the first video block, or refine a signaled motion vector based on at least one motion vector with an offset to the signaled motion vector; and
performing the first conversion based on the determining,
wherein the types of the first reference pictures are at least based on whether the first reference pictures are short term reference pictures.

2. The method of claim 1, wherein the types of the first reference pictures are further based on whether resolutions of the first reference pictures are different from the resolution of the first picture.

3. The method of claim 1, wherein the types of the first reference pictures are further based on picture order count distances of the first reference pictures relative to the first picture.

4. The method of claim 1, wherein the determining includes determining that the first coding tool is disabled for use with the first video block due to at least two of the first reference pictures being of different types.

5. The method of claim 1, wherein the determining includes determining that the first coding tool is disabled for use with the first video block in case that one or all of the first reference pictures are not short term reference pictures.

6. The method of claim 1, wherein the determining includes determining that the first coding tool is disabled for use with the first video block in case that one or all of the first reference pictures is an adaptive resolution picture such that one or all of the first reference pictures has a resolution different from a resolution of the first picture.

7. The method of claim 1, wherein the determining includes determining that the first coding tool is enabled for use with the first video block based on each of the first reference pictures being a short term reference picture.

8. The method of claim 1, wherein the determining includes determining that the first coding tool is enabled for use with the first video block based on none of the first reference pictures being an adaptive resolution picture and wherein each of the first reference pictures has a resolution same as a resolution of the first picture.

9. The method of claim 1, wherein the determining includes determining that the first coding tool is enabled for use with the first video block based on the first reference pictures having same absolute picture order count (POC) distances relative to the first picture.

10. The method of claim 1, further comprising:
determining, for a second conversion between a second video block which is an affine block of a second picture of the video and the bitstream of the video, an applicability of a second coding tool to the second video block based on whether at least one second reference picture used for the second conversion is an adaptive resolution picture; and
performing the second conversion based on the determining,
wherein the second coding tool comprises:
generating initial prediction samples of a sub-block of the second video block; and
applying an optical flow operation to generate final prediction samples for the sub-block by deriving a prediction refinement.

11. The method of claim 10, wherein the determining includes determining that the second coding tool is disabled for use with the second video block in case that one or all of the at least one second reference picture is an adaptive resolution picture (ARP) such that one or all of the at least one second reference picture has a resolution different from a resolution of the second picture.

12. The method of claim 10, wherein the determining includes determining that the second coding tool is enabled for use with the second video block based on none of the at least one second reference picture being an adaptive resolution picture (ARP) and wherein each of the at least one second reference picture has a resolution same as a resolution of the second picture.

13. The method of claim 1, wherein the first conversion includes encoding the first video block into the bitstream.

14. The method of claim 1, wherein the first conversion includes decoding the first video block from the bitstream.

15. An apparatus for processing video data comprising a processor and a non-transitory memory with instructions thereon, wherein the instructions upon execution by the processor, cause the processor to:
determine, for a first conversion between a first video block of a first picture of a video and a bitstream of the video, an applicability of a first coding tool to the first video block based on types of first reference pictures used for the first conversion, wherein the first coding tool is used to refine a motion vector based on at least one gradient value corresponding to a sample in a reference block of the first video block, or refine a signaled motion vector based on at least one motion vector with an offset to the signaled motion vector; and
perform the first conversion based on the determination,
wherein the types of the first reference pictures are at least based on whether the first reference pictures are short term reference pictures.

16. The apparatus of claim 15, wherein the types of the first reference pictures are further based on whether resolutions of the first reference pictures are different from the resolution of the first picture.

17. The apparatus of claim 15, wherein the types of the first reference pictures are further based on picture order count distances of the first reference pictures relative to the first picture.

18. The apparatus of claim 15, wherein the determining includes determining that the first coding tool is disabled for use with the first video block due to at least two of the first reference pictures being of different types.

19. A non-transitory computer-readable storage medium storing instructions that cause a processor to:

determine, for a first conversion between a first video block of a first picture of a video and a bitstream of the video, an applicability of a first coding tool to the first video block based on types of first reference pictures used for the first conversion, wherein the first coding tool is used to refine a motion vector based on at least one gradient value corresponding to a sample in a reference block of the first video block, or refine a signaled motion vector based on at least one motion vector with an offset to the signaled motion vector; and perform the first conversion based on the determination, wherein the types of the first reference pictures are at least based on whether the first reference pictures are short term reference pictures.

20. A non-transitory computer-readable recording medium storing a bitstream of a video which is generated by a method performed by a video processing apparatus, wherein the method comprises:

determining, for a first video block of a first picture of a video, an applicability of a first coding tool to the first video block based on types of first reference pictures used for the first video block, wherein the first coding tool is used to refine a motion vector based on at least one gradient value corresponding to a sample in a reference block of the first video block, or refine a signaled motion vector based on at least one motion vector with an offset to the signaled motion vector; and generating the bitstream based on the determining, wherein the types of the first reference pictures are at least based on whether the first reference pictures are short term reference pictures.

\* \* \* \* \*

UNITED STATES PATENT AND TRADEMARK OFFICE
CERTIFICATE OF CORRECTION

PATENT NO. : 11,323,698 B2
APPLICATION NO. : 17/546717
DATED : May 3, 2022
INVENTOR(S) : Na Zhang et al.

It is certified that error appears in the above-identified patent and that said Letters Patent is hereby corrected as shown below:

On the Title Page

Item (63) Related U.S. Application Data, delete "Jul. 27, 2020" and insert -- Jul. 24, 2020 --, therefor.

Item (30) Foreign Application Priority Data, delete "Jul. 24, 2020
(WO) ............... PCT/CN2020/104087" and insert -- Jul. 27, 2019
(WO) .............. PCT/CN2019/098068 --, therefor.

Signed and Sealed this
Twenty-first Day of May, 2024

Katherine Kelly Vidal
*Director of the United States Patent and Trademark Office*